United States Patent
Kurani et al.

(10) Patent No.: US 11,501,287 B1
(45) Date of Patent: Nov. 15, 2022

(54) SYSTEMS AND METHODS FOR DIGITAL ACCOUNT ACTIVATION

(71) Applicant: Wells Fargo Bank, N.A., San Francisco, CA (US)

(72) Inventors: Ashish B. Kurani, Hillsborough, CA (US); Jenny Y. Tao, Belmont, CA (US); Katherine M. Yee, Orinda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/240,199

(22) Filed: Apr. 26, 2021

Related U.S. Application Data

(63) Continuation of application No. 16/665,677, filed on Oct. 28, 2019, now Pat. No. 10,990,964, which is a continuation of application No. 15/638,517, filed on Jun. 30, 2017, now Pat. No. 10,460,312.

(51) Int. Cl.
| | |
|---|---|
| *G06Q 20/32* | (2012.01) |
| *G06Q 20/34* | (2012.01) |
| *G06Q 20/36* | (2012.01) |
| *G07F 7/10* | (2006.01) |
| *H04M 17/00* | (2006.01) |

(52) U.S. Cl.
CPC ............ *G06Q 20/36* (2013.01); *G06Q 20/32* (2013.01); *G06Q 20/3221* (2013.01); *G06Q 20/34* (2013.01); *G06Q 20/342* (2013.01); *G06Q 20/3558* (2013.01); *G07F 7/1008* (2013.01); *H04M 17/20* (2013.01)

(58) Field of Classification Search
None
See application file for complete search history.

(56) References Cited

U.S. PATENT DOCUMENTS

| | | |
|---|---|---|
| 9,652,770 B1 | 5/2017 | Kurani et al. |
| 2012/0028609 A1 | 2/2012 | Hruska |
| 2012/0047070 A1 | 2/2012 | Pharris |
| 2017/0169507 A1 | 6/2017 | Skaarup et al. |

*Primary Examiner* — Joseph W. King
(74) *Attorney, Agent, or Firm* — Foley & Lardner LLP

(57) ABSTRACT

A method for registering and activating accounts includes: transmitting a first input from a user regarding opening an account at a financial institution; establishing a communication session based on exchanging encryption keys between the user device and the financial computing system; displaying a graphical user interface (GUI) comprising a request for a user verification; transmitting a received user verification to the financial computing system; updating the GUI to display a request to establish a personal identification number (PIN) for a physical payment card associated with the account; receiving the PIN from the user; transmitting a second input comprising the PIN and a request to provision the account to the user device; receiving a payment token associated with the account before the physical payment card associated with the account of the financial computing system is received by the user; and, storing the payment token for transactions via the user device.

15 Claims, 12 Drawing Sheets

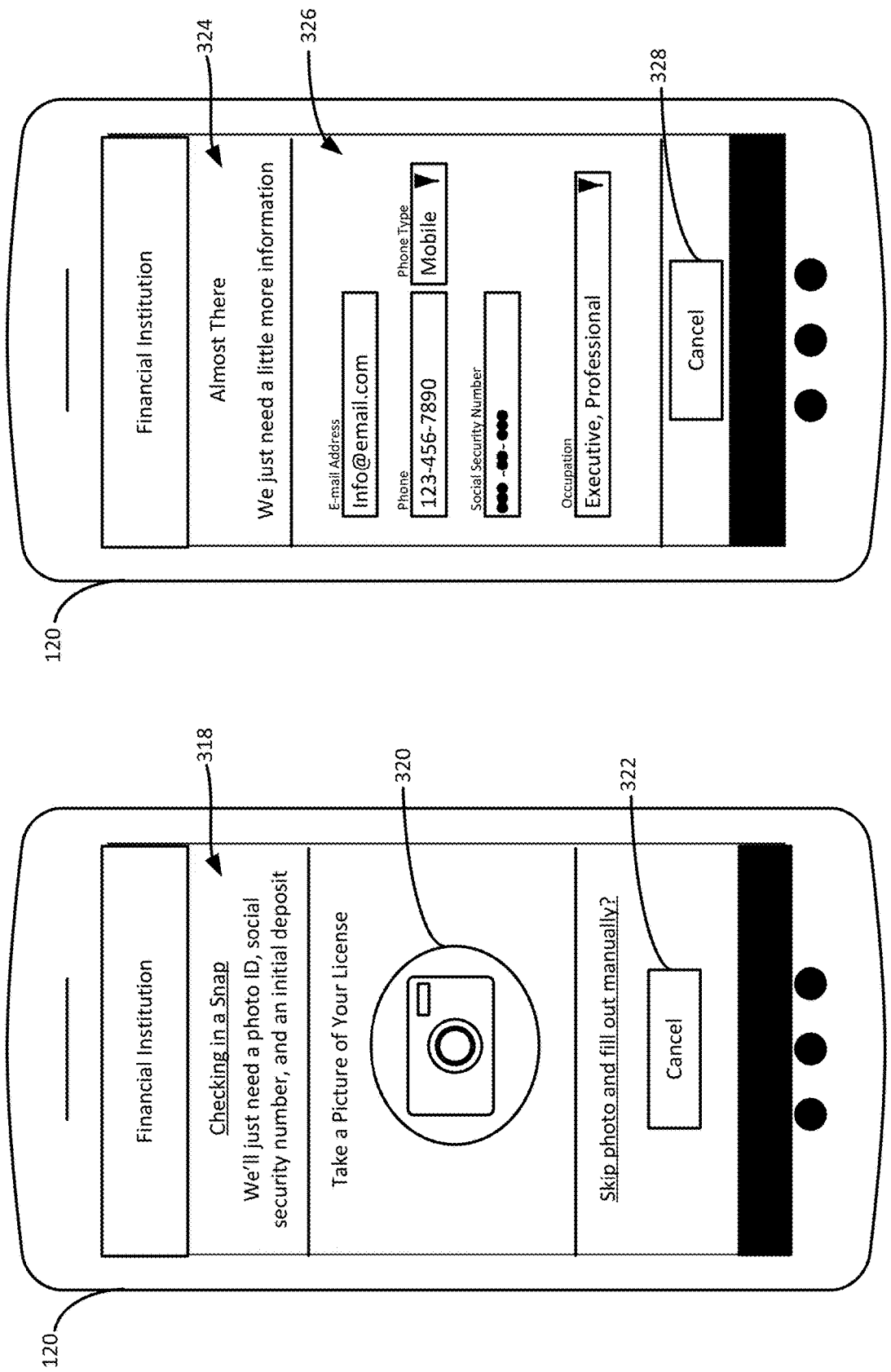

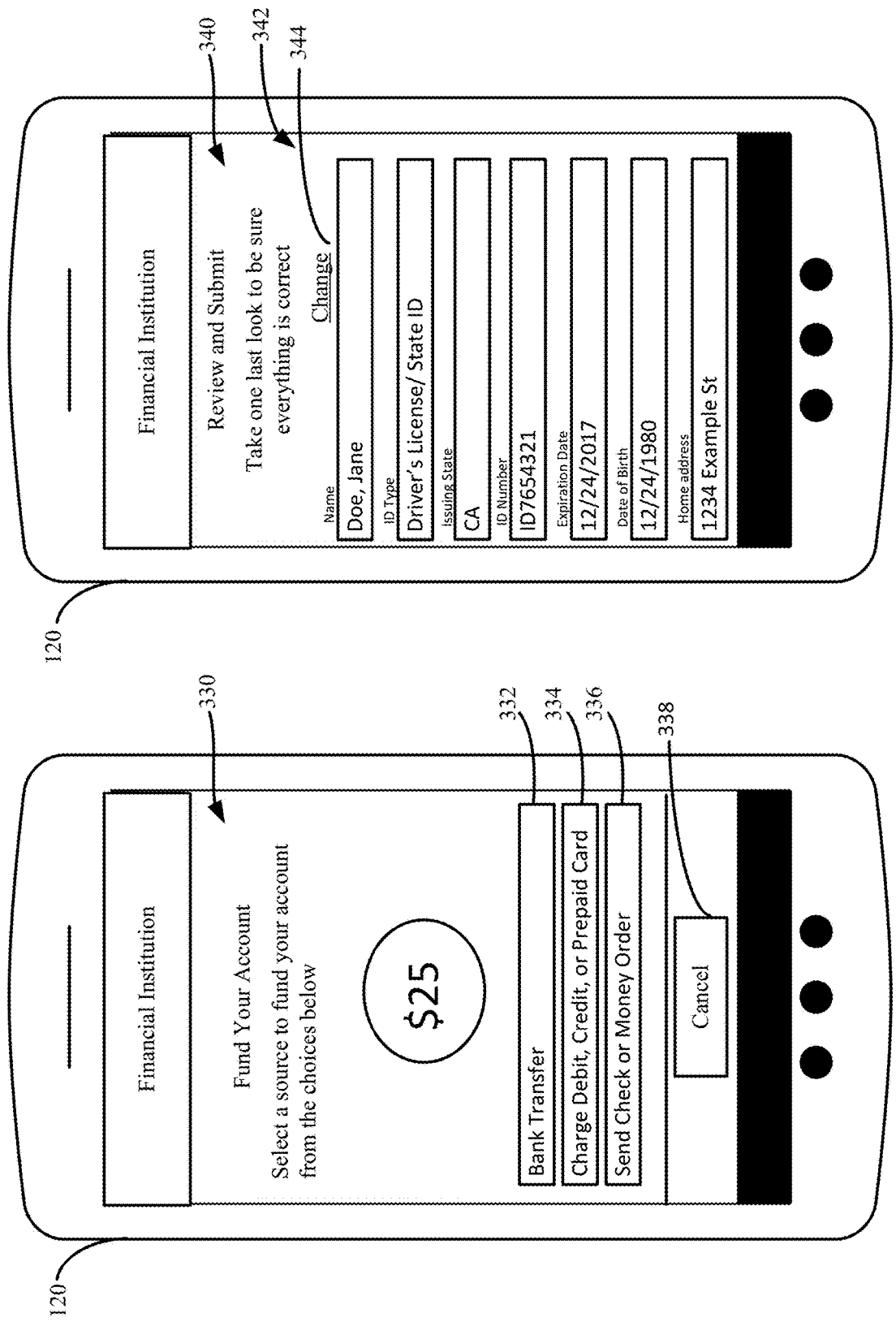

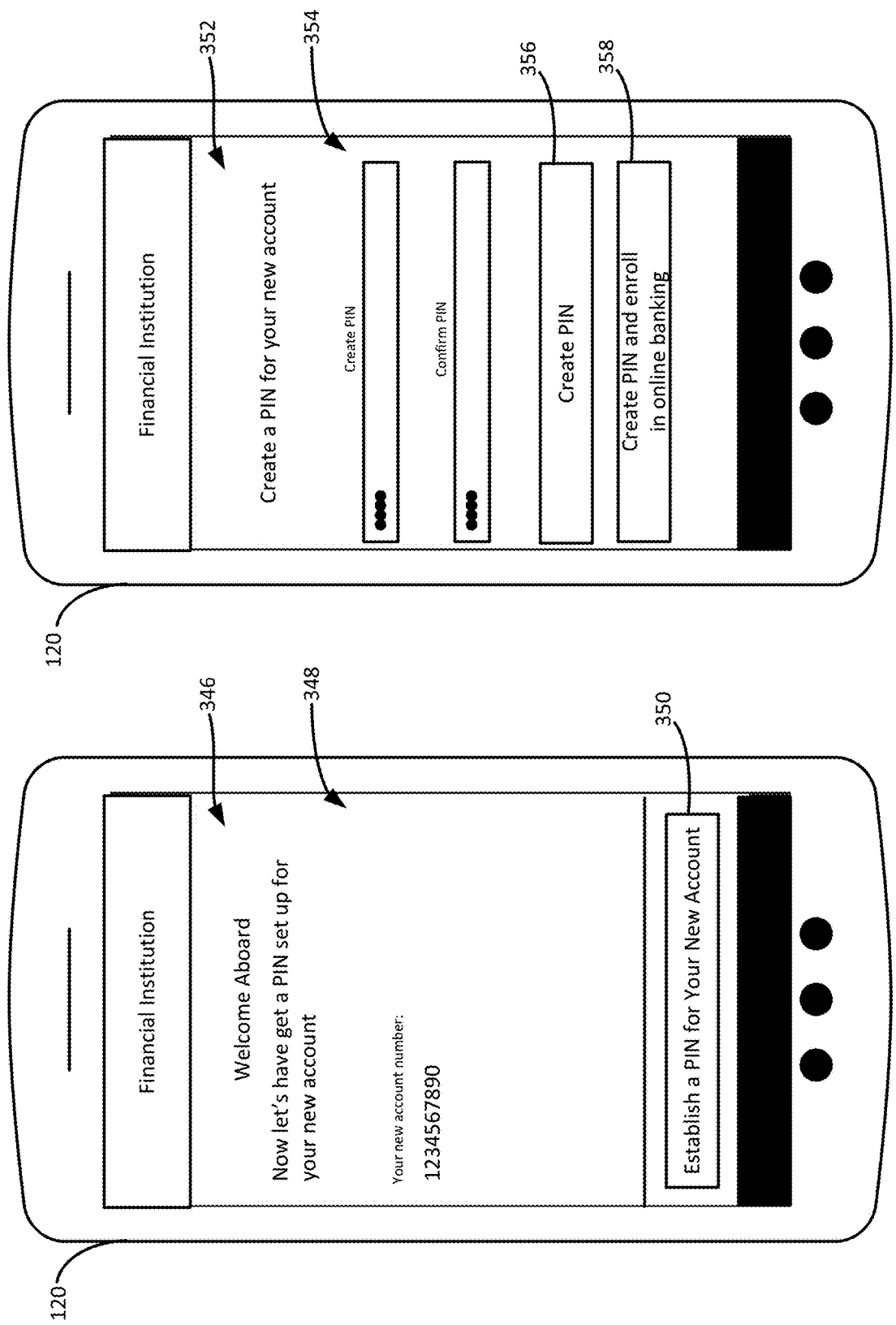

SYSTEMS AND METHODS FOR DIGITAL ACCOUNT ACTIVATION

CROSS-REFERENCE TO RELATED APPLICATIONS

This application is a continuation of U.S. patent application Ser. No. 16/665,677 entitled "Systems and Methods for Digital Account Activation," filed on Oct. 28, 2019, which is a continuation of U.S. patent application Ser. No. 15/638,517 entitled "Systems and Methods for Digital Account Activation," filed on Jun. 30, 2017, both of which are incorporated herein by reference in their entireties.

BACKGROUND

Opening up a financial account can be a burdensome process for a customer. In a traditional account opening process, the customer applies for an account and waits for approval from a financial institution. Upon approval, a physical payment card comes in the mail to the customer and, eventually, the customer is able to use the account to, for example, conduct transactions. These multiple sources of lag time can be irritating and burdensome for the customer. Thus, it would be beneficial to provide a streamlined account opening process.

SUMMARY

One embodiment relates to a computer-implemented method. The method includes receiving, by a financial institution computing system associated with a financial institution, a first input from a customer to establish an account at the financial institution and to have a physical payment card associated with the account. The method also includes approving, by the financial institution computing system, the customer for the account based on account registration information received from the customer. The method also includes establishing, by the financial institution computing system, the account for the customer, wherein establishing the account includes generating a card number for the physical payment card and associating the card number with a first status indicator, the first status indicator being associated with an inactive status of the physical payment card. The method also includes, in response to establishing the account, transmitting, by the financial institution computing system, a prompt instructing the customer to establish a personal identification number (PIN) for the account. The method also includes receiving, by the financial institution computing system, a customer-input PIN for the account. The method also includes receiving, by the financial institution computing system, a second input from the customer to access a mobile wallet account, the second input containing customer mobile wallet information. The method also includes identifying, by the financial institution computing system, the account based on the customer mobile wallet information. The method also includes receiving, by the financial institution computing system, a third input from the customer to provision the account to the mobile wallet account before creation of the physical payment card. The method also includes provisioning, by the financial institution computing system, the account to the mobile wallet account. The method also includes associating, by the financial institution computing system, the card number with a second status indicator, the second status indicator associated with a digitally-active status to enable the customer to engage in mobile wallet transactions with the account.

Another embodiment relates to a financial institution computing system associated with a financial institution. The financial institution computing system includes a network interface configured to communicate data over a network. The financial institution computing system also includes an accounts database configured to store information pertaining to a plurality of accounts associated with a plurality of customers of the financial institution. The financial institution computing system also includes a processing circuit configured to receive, by the network interface, a first input from a customer to establish an account at the financial institution and to have a physical payment card associated with the account. The processing circuit is also configured to approve the customer for the account based on account registration information received from the customer. The processing circuit is also configured to establish the account for the customer, wherein establishing the account includes generating a card number for the physical payment card and associating the card number with a first status indicator, the first status indicator being associated with an inactive status of the physical payment card. The processing circuit is also configured to, in response to establishing the account, transmit, by the network interface, a prompt instructing the customer to establish a personal identification number (PIN) for the account. The processing circuit is also configured to receive, by the network interface, a customer-input PIN for the account. The processing circuit is also configured to receiving, by the financial institution computing system, a second input from the customer to access a mobile wallet account, the second input containing customer mobile wallet information. The processing circuit is also configured to identify the account based on the customer mobile wallet information. The processing circuit is also configured to receive, by the network interface, a third input from the customer to provision the account to the mobile wallet account before creation of the physical payment card. The processing circuit is also configured to provision the account to the mobile wallet account. The processing circuit is also configured to associate the card number with a second status indicator, the second status indicator associated with a digitally active status to enable the customer to engage in mobile wallet transactions with the account.

Another embodiment relates to a non-transitory computer readable media having computer-executable instructions embodied therein that, when executed by a processor of a financial institution computing system associated with a financial institution, cause the processor to perform operations. The operations include receiving a first input from a customer to establish an account at the financial institution and to have a physical payment card associated with the account. The operations also include approving the customer for the account based on account registration information received from the customer. The operations also include establishing the account for the customer, wherein establishing the account includes generating a card number for the physical payment card and associating the card number with a first status indicator, the first status indicator being associated with an inactive status of the physical payment card. The operations also include in response to establishing the account, transmitting a prompt instructing the customer to establish a personal identification number (PIN) for the account. The operations also include receiving a customer-input PIN for the account. The operations also include receiving a second input from the customer to access a mobile wallet account, the second input containing customer mobile wallet information. The operations also include identifying the account based on the customer mobile wallet information. The operations also include receiving a third input from the customer to provision the account to the mobile wallet account before creation of the physical payment card. The operations also include provisioning the account to the mobile wallet account. The operations also include associating the card number with a second status indicator, the second status indicator associated with a digitally active status to enable the customer to engage in mobile wallet transactions with the account.

BRIEF DESCRIPTION OF THE DRAWINGS

FIGS. 3A-3I are graphical user interfaces presented to a customer during a process to establish and activate a new customer account, according to various example embodiments.

DETAILED DESCRIPTION

Figure 1:
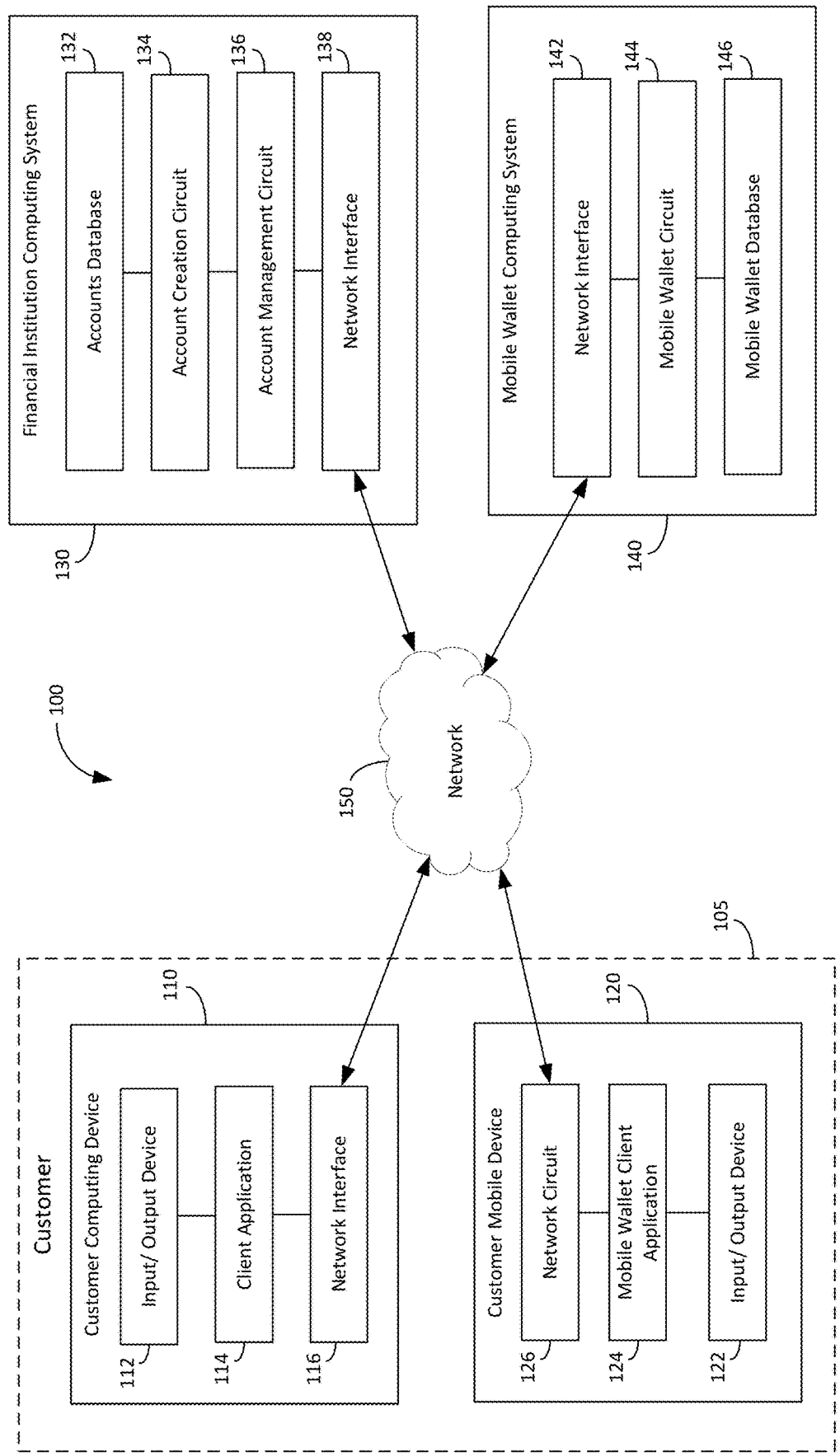
FIG. 1 is a block diagram of an account activation system, according to an example embodiment.

Before turning to the figures, which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Various embodiments discussed herein relate to systems and methods for providing an efficient and streamlined account registration and activation process to, for example, enable financial institutions to engage with new customers. In various embodiments, a computing system associated with a financial institution receives a request from a customer to open an account (e.g., a checking account) at the financial institution. In response, the computing system approves the customer for an account based on information received from the customer. After or prior to the customer being approved, the computing system prompts the customer to select a personal identification number ("PIN") to use with the new account. The computing system then creates the new customer account with the customer-selected PIN and generates a card number for a physical payment card that is sent to the customer and associated with the account. As such, the systems and methods disclosed herein enable a new customer previously unaffiliated with the financial institution to establish an account and create a PIN for the account prior to the generation of a physical payment card for the account.

Additionally, the systems and methods disclosed herein enable the customer to utilize the new account prior to the customer receiving the physical payment card in the mail. For example, the customer may download an application (e.g., a mobile wallet application) associated with the financial institution on a mobile device associated with the customer. From within the application, the customer may provide an input to digitally activate a card number associated with the account prior to the customer receiving the physical payment card. In response, the computing system may associate an active status indicator with the account and provision the account to the customer's mobile wallet, thereby enabling the customer to utilize the new account soon after (e.g., within minutes) of the customer initially applying for the account at the financial institution. In one embodiment, the activation for use in the mobile wallet occurs less than one minute after the customer initially requests to create the account at the financial institution.

As used herein, the term "activate," when used in relation to a card or card number associated with a customer account, refers to a process performed by a computing system associated with the financial institution to render the card or card number available for use in various types of transactions. In other words, prior to a card or card number's activation, the card or card number is unavailable for use in transactions. In various embodiments, there are multiple tiers of activation for a customer card or card number. For example, in one embodiment, when a card number is in a first activation tier, the card number is only available for use in tokenized transaction (e.g., transactions utilizing not the actual value of the card number, but a surrogate value of the card number such as in a mobile wallet transaction). However, when the card number is in a second activation tier, the card number may be utilized via a number of different channels (e.g., magnetic stripe reader, e-commerce transactions, and mobile wallet transactions).

The embodiments and implementations of the systems and methods disclosed herein propose a novel account activation sequence to facilitate earlier access to accounts while ensuring security of customer information. By establishing a customer account in real time rather than on a periodic basis as in current methods, the systems and methods disclosed herein permit customers to establish credentials associated with the account such as a personal identification number ("PIN"), activate the account, and utilize the account in transaction sooner than in existing methods.

Additionally, the systems and methods disclosed herein identify new parameters for customer account identification processes to enable inactivated customer accounts to be accessed via, for example, mobile applications. When a customer accesses an application such as a mobile wallet application, traditional systems only identify customer accounts having an activated physical payment card associated therewith. As such, new customer accounts not having an associated physical payment card do not show up in the customer's mobile wallet and are unavailable for use by the customer. The systems and methods disclosed herein, however, enable payment service providers (e.g., mobile wallet providers, person-to-person payment platforms, mobile banking platforms, financial health monitoring platforms) to identify such new customer accounts, thereby facilitating early customer access to accounts.

Additionally, the systems and methods disclosed herein provide a technical solution for enabling digital activation of payment cards. Specifically, by tying the activation of a payment card to the provisioning of a payment card to a customer's mobile wallet, for example, the systems and methods disclosed herein enable an inactivated user payment card to be transformed into a functional payment card in response to the customer performing a single provisioning step. What once took customers multiple steps (e.g., manual activation of a payment card, provisioning the payment card to a mobile wallet) takes place in a single step in accordance with the systems and methods herein. As such, the systems and methods herein provide a convenient, efficient process flow enabling customers to activate payment cards.

Referring now to FIG. 1, a block diagram of an account activation system 100 is shown, according to an example embodiment. As shown, the account activation system 100 includes a customer computing device 110 and a customer mobile device 120 associated with a customer 105 (hereafter referred to as "the customer"), a financial institution computing system 130 associated with a financial institution, and a mobile wallet computing system 140 associated with a mobile wallet provider. The various systems and devices may be communicatively and operatively coupled through a network 150, which may include one or more of the Internet, cellular network, Wi-Fi, Wi-Max, a proprietary banking network, or any other type of wired or wireless network or a combination of wired and wireless networks. As described herein, the account activation system 100 may be used to enable the customer to efficiently and conveniently establish an account at the financial institution, and utilize the new account via the customer mobile device 120.

The customer computing device 110 is a computing device associated with the customer. The customer may include one or more individuals, business entities, government entities, and agents. In various embodiments, the customer may utilize the customer computing device 110 to initiate the account activation methods described herein and to manage accounts held by the customer at the financial institution. Examples of the customer computing device 110 include a personal computer such as a desktop or laptop computer.

The customer computing device 110 includes a network interface 116 configured to communicate data over the network 150, a client application 114, and an input/output ("I/O") device 112. The I/O device 112 includes hardware and associated logics configured to enable the customer computing device 110 to exchange information with a customer (e.g., via a touch display) and other devices (e.g., a merchant transaction terminal). The I/O device 112 may include systems, components, devices, and apparatuses that serve both input and output functions, configured to exchange information with external systems (e.g., merchant point of sale devices, computing devices associated with other individuals). Such systems, components, devices and apparatuses include, for example, radio frequency transceivers (e.g., RF or NFC-based transceivers) and other short range wireless transceivers (e.g., Bluetooth®, laser-based data transmitters, etc.).

The client application 114 is structured to provide displays to the customer computing device 110 that enable the customer to communicate with the financial institution computing system 130 over the network 150. Accordingly, the client application 114 is communicably coupled to the network interface 116. The displays provided by the client application 114 may enable the customer to view information regarding various products (e.g., accounts, advising such as wealth management, financial services, and other financial products), and register for an account at the financial institution. Further, if the customer has established an account with the financial institution, the displays may enable the customer to manage the account. As such, the displays provided by the client application 114 may be indicative of current account balances, pending transactions, profile information (e.g., contact information), and the like.

In some embodiments, the client application 114 is a separate software application implemented on the customer computing device 110. The client application 114 may be downloaded by the customer computing device 110 prior to its usage, hard coded into the memory of the customer computing device 110, or be a web-based interface application such that the customer computing device 110 may provide a web browser to the application, which may be executed remotely from the customer computing device 110 or downloaded by the customer computing device 110 just prior to its usage. In some embodiments, parts of the client application 114 may be stored in the memory of the customer computing device 110 and others may be web-based. In such instances, the customer may have to log onto or access the web-based interface before usage of the applications. Further, and in this regard, the client application 114 may be supported by a separate computing system including one or more servers, processors, network interface circuits, etc. that transmit applications for use to the customer computing device 110. In certain embodiments, the client application 114 includes an API and/or a software development kit (SDK) that facilitates the integration of other applications.

The client application 114 is configured to aid the customer in establishing an account at the financial institution. In such embodiments, the client application 114 may be at least partly web-based. For example, while the customer computing device 110 is executing a web browser, the customer may access a website run by the financial institution computing system 130 (e.g., by typing in a domain name associated with the website, clicking a hyperlink to the domain name, etc.) through any established communications protocol, and provide an input to create an account at the financial institution. In response to such an input, the financial institution computing system 130 may transmit various datasets, instructions, and program logics to the customer computing device 110 over the network 150. The datasets may include various parameters to render various account registration interfaces to the customer via the customer I/O device 112. Such registration interfaces may enable the customer to provide various inputs to the program logics to provide the financial institution computing system 130 with information for the establishment of a new customer account.

The customer mobile device 120 is a mobile computing device associated with the customer. In accordance with the systems and methods disclosed herein, the customer may utilize the customer mobile device 120 to register for an account at the financial institution, manage accounts held by the customer at the financial institution, and engage in transactions (e.g., via the mobile wallet client application 124). Examples of the customer mobile device 120 include smartphones, tablets, or wearable computing devices such as smartwatches and the like.

In the example shown, the customer mobile device 120 includes a network interface 126 enabling the customer mobile device 120 to communicate data over the network 150, a mobile wallet client application 124, and an I/O device 122. The I/O device 122 includes hardware and associated circuits configured to communicate with the customer and other computing systems via similar components as those discussed above with respect to the I/O device 112.

The mobile wallet client application 124 is structured to facilitate and permit payments by interfacing with various accounts held by the customer at various financial institutions (e.g., the financial institution associated with the financial institution computing system 130 and/or other financial institutions). Accordingly, in some arrangements, the mobile wallet client application 124 is communicably coupled via the network interface 126 over the network 150 to the mobile wallet computing system 140. In some embodiments, the mobile wallet client application 124 includes a circuit embodied within the customer mobile device 120. For example, the mobile wallet client application 124 may include program logic stored in a system memory of the customer mobile device 120. In such arrangements, the program logic may configure a processor of the customer mobile device 120 to perform at least some of the functions discussed herein with respect to the mobile wallet circuit 144 of the mobile wallet computing system 140. In some embodiments, the mobile wallet client application 124 is a web-based application, and many of the functionalities are provided at the mobile wallet circuit 144 of the mobile wallet computing system 140. As will be understood, the level of functionality that resides on the customer mobile device 120 versus the mobile wallet computing system 140 will vary depending on the implementation.

In various arrangements, the mobile wallet client application 124 is structured to permit mobile wallet customers to engage in transactions through the initiation of communications with, for example, a merchant point of sale device. In this regard, the customer mobile device 120 may include a near field communications (NFC) chip and an associated controller that configures the chip to exchange information with the merchant point of sale device (e.g., an NFC reader). It should be understood that the role that the mobile wallet client application 124 takes in payment transactions will depend on the implementation of the mobile wallet. In some arrangements, for example, the mobile wallet is implemented in a secure element framework. In such arrangements, the customer mobile device 120 includes a secure element that is separate from the main system memory of the customer mobile device. The secure element may include any element having smart card functionalities, such as a universal subscriber identity circuit (a SIM card) or a secure digital card. In such arrangements, customer authentication information (e.g., payment account information, customer PINS, and the like) is stored in the secure element. In various arrangements, the secure element of the customer mobile device 120 may include a payment application that interfaces with the NFC chip of the customer device responsive to receiving a communication (e.g., an application protocol data unit) from the merchant point of sale device to enable customer payment information be transferred. In such arrangements, no customer information is transferred by the mobile wallet client application 124 to the NFC chip. After customer payment information is transmitted to the merchant point of sale device, the mobile wallet client application 124 may query the secure element for transaction data to notify the customer of the completed transaction.

In other arrangements, the mobile wallet client application 124 may operate under a host card emulation framework. In such arrangements, customer payment information is maintained within the mobile wallet client application 124 or cloud-based environment (e.g., a host emulation service or the mobile wallet database 146) rather than in the secure element. In this regard, the mobile wallet client application 124 may include a service component (e.g., a payment application) configured to interface with the NFC chip of the customer mobile device 120 to communicate customer payment tokens to the merchant point of sale device. To ensure security of customer information, the mobile wallet client application 124 may include sandboxing functionalities where a unique customer ID (UID) is assigned to the mobile wallet client application 124, and where only other applications including the same UID may share information stored in relation to the mobile wallet client application 124.

In various other arrangements, the customer-specific payment information may be stored in a trusted execution environment ("TEE") within a processor the customer mobile device 120. The systems and methods disclosed herein may also be used with other modalities currently available for storage and transfer of customer payment device via contactless communication mechanisms.

In some arrangements, the mobile wallet client application 124 is structured to enable the customer to manage a mobile wallet. In this regard, the mobile wallet client application 124 is structured to present, control, and otherwise manage displays or graphical user interfaces on the customer mobile device 120 including information pertaining to various payment accounts. For example, the mobile wallet client application 124 may present the customer with displays enabling the customer to input information pertaining to various payment accounts. The screens may enable the customer to manually input information (e.g., a PAN) pertaining to a payment account, or enable the customer to take a picture of a payment account. The mobile wallet client application 124 may then process the information input by the customer, identify account information, and transmit the information to the mobile wallet computing system 140 for storage (e.g., in the mobile wallet database 146) in association with the customer. Once information pertaining to various payment accounts has been received by the mobile wallet computing system 140, the mobile wallet client application 124 is configured to present displays that enable the customer to select a payment account from amongst a plurality of payment accounts. Once a payment account is selected, the displays may further enable the customer to perform various actions using the selected payment account (e.g., use the selected account to complete a mobile wallet transaction, manage an account at a financial institution associated with the selected payment account, view a transaction history associated with the payment account, and the like).

In some embodiments, in addition to the mobile wallet client application 124, the customer mobile device 120 also includes a client application (not shown) associated with the financial institution associated with the financial institution computing system 130. For example, the client application may be a mobile banking application configured to provide the customer with displays enabling the customer to manage accounts held by the customer at the financial institution. As will be appreciated, the functionalities residing on the customer mobile device 120 as opposed to the financial institution computing system 130 may vary depending on the implementation.

Still referring to FIG. 1, the financial institution computing system 130 is a computing system associated with the financial institution configured to establish and maintain customer accounts. The financial institution may include commercial or private banks, credit unions, investment brokerages, or the like. In response to receiving an input from the customer to establish an account, the financial institution computing system 130 may be configured to initiate an account creation sequence specifically for the customer. For example, the financial institution computing system 130 may transit instructions, program logic and values to the customer devices 110 and 120 over the network 150 that cause various registration interfaces to be presented to the customer. Such registration interfaces may request the customer to capture an image of identification (e.g., a driver's license or other government-issued identification), capture a customer verification image or video (e.g., of the customer's face), and input various forms of information (e.g., required information to open up a checking account at the financial institution). Upon receiving such information, the financial institution computing system 130 may verify the identity of the customer, and perform additional operations described herein to create an account for the customer.

In the example shown, the financial institution computing system 130 includes a network interface 138 configured to communicate data over the network 150, an account management circuit 136, an account creation circuit 134, and an accounts database 132. The accounts database 132 is structured to retrievably store information pertaining to accounts held by a number of customers at the financial institution. The accounts database 132 may include non-transient data storage mediums (e.g., local disc or flash-based hard drives, local network servers) or remote data storage facilities (e.g., cloud servers). The accounts database 132 may include personal customer information (e.g., names, addresses, phone numbers), identification information (e.g., driver's license numbers, standard biometric data), and customer financial information (e.g., token information, account numbers, account balances, available credit, credit history, transaction histories).

The account creation circuit 134 is configured to aid the customer through a process to register for a new account at the financial institution. In this regard, in response to receiving an input from the customer to establish a new account at the financial institution from one of the customer devices 110 and 120, the account creation circuit 134 may provide a registration packet to the customer over the network 150. The registration packet may include logics, instructions, and datasets configured to present the customer with a series of registration interfaces to collect information from the customer needed to establish a customer account at the financial institution (e.g., a photo of a form of identification, personal customer information such as a phone number or social security number).

Upon receiving such information from the customer, the account creation circuit 134 may perform one or more steps to verify the identity of the customer. For example, the account creation circuit 134 may request information pertaining to the customer from an external data source (e.g., a credit bureau) and use such information to formulate a security question for the customer to answer. Additionally, the account creation circuit 134 may use a customer phone number to verify the customer by communicating with an external service provider (e.g., Payfone®) to verify that the customer owns or is associated with a device associated with the phone number.

Having verified the customer's identity, the account creation circuit 134 may generate an account for the customer and initiate a sequence to issue a physical payment card (e.g., a debit card) to the customer prior to the activation of the card. In this regard, the account creation circuit 134 may generate an account number of the customer's account. For example, in one embodiment, the financial institution computing system 130 maintains a queue of unique account numbers that have not yet been assigned to any customers. In response to approving the customer for an account, the account creation circuit 134 may retrieve an unique account number from the queue and assign the unique account number to the customer. In some embodiments, the account creation circuit 134 generates an unique account number for the customer in real-time upon the customer being approved for the account. Upon assigning an account number to the customer, the account creation circuit 134 creates an entry in the accounts database 132 for the customer's new account and stores the information received from the customer during the registration process in relation to the customer's account.

Additionally, after the customer is approved for an account, the account creation circuit 134 also performs a sequence to associate a payment card (e.g., a debit card) with the customer's new account. In this regard, the account creation circuit 134 takes steps to generate various parameters (e.g., a payment card number, expiration date, and card verification value) that are to be associated with the payment card. For example, the account creation circuit 134 may generate a unique card number for the customer in accordance with the ISO/IEC 7812 standard (e.g., by selecting a card number from a queue) and transmit the card number to a card network computing system to have additional parameters (e.g., the card verification value) associated with the card number. Once all of these parameters are associated with the card number, the account creation circuit 134 may initiate a sequence to generate a physical payment card containing such parameters and send the physical payment card to the customer. Additionally, prior to all of the necessary parameters for the payment card being generated, the card number may be stored in the accounts database 132 in association with the customer's account. In some embodiments, after such an initial storage of the card number, the card number has an inactive status indicator associated therewith. As such, the card number is not yet available for use in any sort of transaction by the customer.

The account management circuit 136 is configured to manage the financial accounts of various customers, including maintaining and handling transaction processing for various customer accounts. In some embodiments, the account management circuit 136 is configured to provide a client application (e.g., a mobile banking application). In this regard, the account management circuit 136 is configured to provide interfaces, displays, and associated content to enable management of customer accounts at the financial institution associated with the financial institution computing system 130.

In some embodiments, the account management circuit 136 is configured to update a status of a new customer account. For example, as described herein, via the mobile wallet client application 124, the customer may indicate a preference to provision a new, but not yet active customer account to the customer's mobile wallet. In response, the account management circuit 136 (e.g., in response to receiving a notification signal from the mobile wallet computing system 140) queries the customer regarding the PIN established by the customer while registering for the account (e.g., by transmitting the retrieved PIN to the mobile wallet computing system 140, which may query the customer and verify the customer's PIN). If the customer enters a PIN that matches the established PIN, the account management circuit 136 may activate the new customer account and provide information regarding the customer account (e.g., a personal account number) to the mobile wallet computing system 140 to enable the account to be provisioned to the customer's mobile wallet for use in conducting mobile transactions.

The mobile wallet computing system 140 is structured to permit, enable, facilitate, manage, process, and otherwise allow mobile wallet transactions. As used herein, the term "mobile wallet transaction" is meant to be broadly interpreted to refer to transactions accomplished via the mobile wallet on the user mobile device. As such, the mobile transaction may include, but is not limited to, a person-to-person payment, a payment for a good or service at a point-of-sale terminal of a merchant, etc. The mobile wallet computing system 140 may be associated with, owned by, and/or otherwise operated by a mobile wallet provider. In one embodiment, the mobile wallet provider may be a financial institution, such as the financial institution associated with the financial institution computing system 130. In this instance, the mobile wallet computing system 140 may be a part of the financial institution computing system 130. In another embodiment and as shown, the mobile wallet provider may be a third party provider relative to the financial institution that operates the financial institution computing system 130.

In any configuration, the mobile wallet computing system 140 includes a mobile wallet circuit 144. As described in more detail herein, the "mobile wallet" is a digital wallet provided on the customer mobile device 120. The digital wallet may include payment capabilities, such as the ability to use a communication protocol (e.g., near-field communication) at a point-of-sale terminal to transfer payment information and enable the purchase of a good or service. Additionally, the digital wallet may include many other capabilities, functions, and features.

In arrangements where the mobile wallet provider is the financial institution associated with the financial institution computing system 130, each of the operations described herein with respect to the mobile wallet computing system 140 may also be described as being performed by the same financial institution. In such arrangements, the financial institution computing system 130 and the mobile wallet computing system 140 may be operated as a single computing system, or as two or more separate computing systems (as shown in FIG. 1) performing the associated functions described herein. As will be appreciated, the level of functionality that resides on the financial institution computing system 130 as opposed to the mobile wallet computing system 140 in these arrangements may vary depending on the implementation.

With the above in mind, the mobile wallet computing system 140 is shown to include a network interface 142 configured to 150 to exchange data over the network 150, a mobile wallet circuit 144, and a mobile wallet database 146.

Mobile wallet database 146 is structured to store information regarding mobile wallet accounts held by various users, such as for a mobile wallet account held by the customer. For instance, the mobile wallet database 146 may store various forms of information related to the customer and/or an associated mobile device upon registration of one or both for a mobile wallet. The stored mobile wallet account information may include authentication information (e.g., username/password combinations, device authentication tokens, security question answers, etc.), payment card information, transaction history, account holder identifying information, registered device information, and any other information that may be encountered in the operation of a mobile wallet account or otherwise referenced herein. In some arrangements, the mobile wallet database 146 also includes a token vault that is maintained by the mobile wallet computing system 140. The token vault may include a lookup table or other process/mechanism for maintaining tokens associated with various customer payment accounts. The tokens stored therein may be generated internally (e.g., at the mobile wallet computing system 140) or by other entities (e.g., a card network computing system). For example, in one embodiment, the token vault may include a lookup table including tokens that that have been randomly assigned to payment accounts by the mobile wallet computing system 140. In some arrangements, the mobile wallet computing system 140 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer.

The mobile wallet circuit 144 is structured to provide a mobile wallet on the customer mobile device 120. In some embodiments, the mobile wallet circuit 144 is structured to provide a mobile wallet client application (e.g., the mobile wallet client application 124) on customer mobile device 120. In this regard, the mobile wallet circuit 144 enables registrations of a user for a mobile wallet, presents the user with various user interfaces enabling user to use or manage a mobile wallet, and enables users to perform transactions using the mobile wallet.

For example, in response to receiving a customer preference to register for a mobile wallet, the mobile wallet computing system 140 may transmit the mobile wallet client application 124 to the customer mobile device 120 for installation. Once installed, the mobile wallet client application 124 may present the customer with an interface configured to receive various inputs regarding the customer's mobile wallet. For example, via such initial interfaces, the customer may input identifying information (e.g., name, address, social security number), establish a set of login credentials for the mobile wallet, and input information regarding customer payment accounts such as account numbers, expiration dates, and the like (e.g., by capturing images of customer payment cards). The mobile wallet circuit 144 is configured to perform various options on such information to enable the customer to utilize the mobile wallet account. For example, upon the customer entering an account number, the mobile wallet circuit 144 may perform a sequence to create a token for the customer-input account number, and store the token in association with the customer's mobile wallet account in the mobile wallet database 146 to enable the customer to engage in transactions using the account.

In some embodiments, based on the identity of the customer (e.g., after the customer's registration and the activation of the customer's new account), the mobile wallet circuit 144 is configured to identify various accounts held by the customer at financial institutions (e.g., the financial institution associated with the financial institution computing system 130 as well as other financial institutions) and present the customer with an interface including the identified accounts. On such an interface, the customer may indicate a preference to provision one or more of the identified accounts to the customer's mobile wallet. For example, in embodiments wherein the mobile wallet circuit 144 is provided by the financial institution computing system 130, the mobile wallet circuit may access the accounts database 132 to identify any accounts held by the customer and present the customer with various depictions of the identified accounts. In accordance with the various embodiments herein, the mobile wallet circuit 144 is configured to present the customer with a depiction of a payment card number associated with a recently-created customer account even if the associated payment card has not yet been activated by the customer. As described herein, in response to the customer indicating a preference to activate a payment card number within the customer's mobile wallet, the account management circuit 136 may activate the payment card and enable the customer's account to be provisioned to the customer's mobile wallet.

In some embodiments, the mobile wallet circuit 144 includes payment processing logic structured to process customer payment requests. For example, the customer may indicate a preference to engage in a mobile wallet transaction using an account provisioned to the customer's mobile wallet. The mobile wallet client application 124 provided on the customer mobile device 120 may then transmit transaction information, a token, and any other payment information or security information (e.g., a cryptogram) to a merchant, which may then transmit the token and the aforementioned described information to the mobile wallet computing system 140 and/or payment network. The mobile wallet circuit 144 may receive this information and either de-tokenize the token or transmit the token to an external computing system for de-tokenization. Once the token is de-tokenized, the mobile wallet circuit 144 may identify the financial institution associated with the account and transmit the transaction information to the financial institution computing system 130, which may authorize the transaction request. In response to receiving an authorization from the financial institution computing system 130, the mobile wallet circuit 144 may transmit an authorization to the merchant over the network 150, which may enable the customer to complete the desired transaction. As will be appreciated, the role that the mobile wallet circuit 144 serves in mobile wallet transactions may vary depending on the implementation of the customer's mobile wallet. For example, in arrangements where the customer's mobile wallet operates under a host emulation framework, the mobile wallet circuit 144 may transmit payment information (e.g., tokens) to the customer mobile device 120 to enable the customer to initiate a mobile wallet transaction. On the other hand, in arrangements where the mobile wallet is implemented in a secure element framework, the mobile wallet circuit may not perform such functions.

Figure 2A:
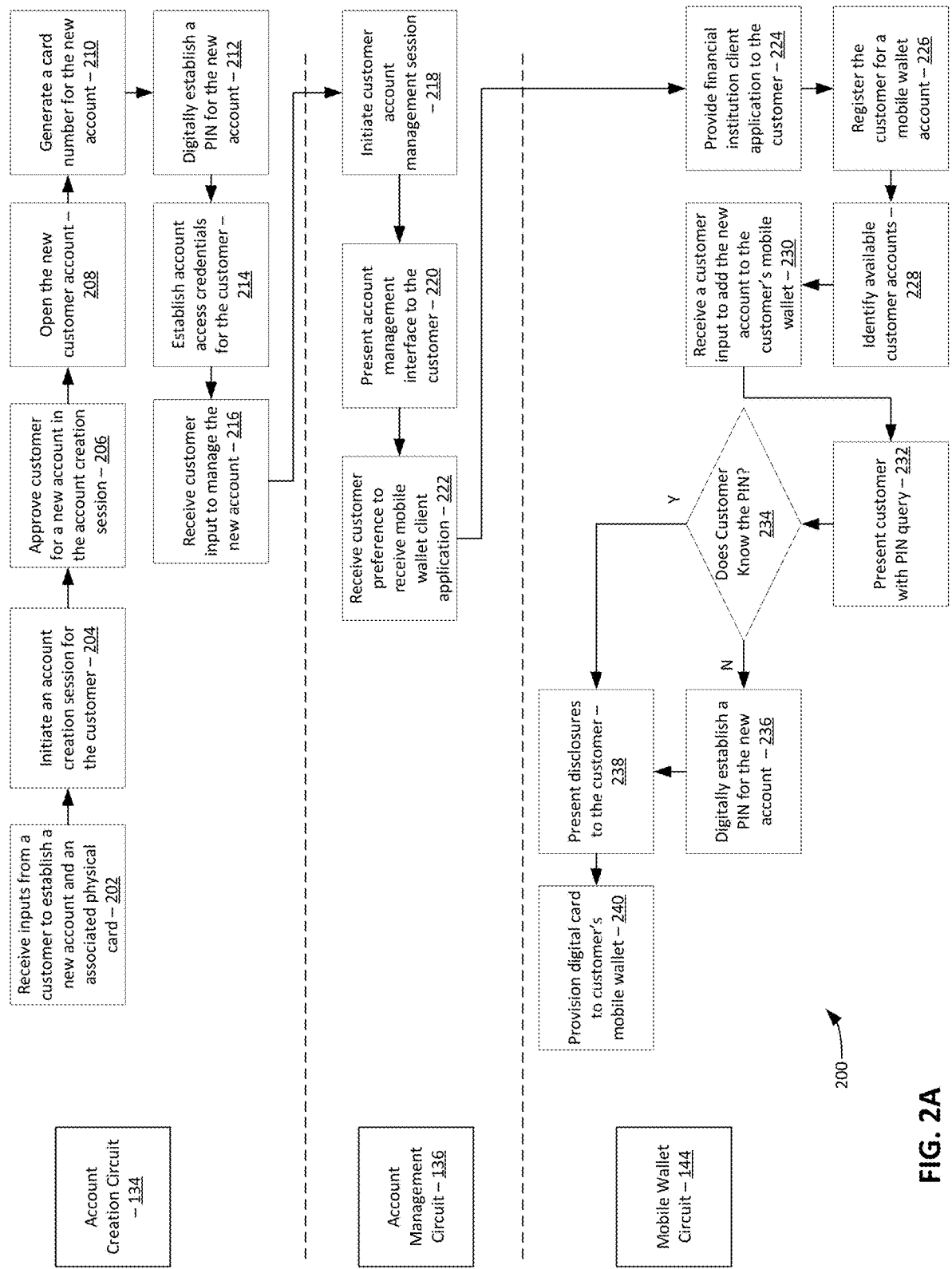
FIGS. 2A-2F are flow diagrams of processes for establishing and activating new customer accounts, according to various example embodiments.

Referring now to FIG. 2A, a flow diagram of a method 200 of activating a customer account is shown, according to an example embodiment. The method 200 may be performed by the components of FIG. 1, such that reference may be made to one or more components of FIG. 1 to aid description of the method 200. In various embodiments, the method 200 may be executed to enable a new customer previously unaffiliated with the financial institution associated with the financial institution computing system 130 to establish and activate an account at the financial institution via the customer mobile device 120 (i.e., a net new and not existing customer of the financial institution). Technically and advantageously, such a process alleviates the need for the customers to physically visit the financial institution and hastens the enrollment process for a new account.

At process 202, a customer input to establish a new account is received. In the example shown in FIG. 2, via the customer mobile device 120, the customer initiates communications with the financial institution computing system 130 over the network 150. For example, via a web browser, the customer may access a website associated with the financial institution, which may present the user with an interface configured to receive the customer input to establish various types of accounts (e.g., checking accounts) offered by the financial institution.

In response to receiving a customer account opening input, the account creation circuit 134 establishes an account creation session for the customer at process 204. For example, encryption keys may be exchanged between the customer computing device 110 and the financial institution computing system 130 to create a secure communications session. Upon the establishment of the account creation session, the account creation circuit 134 may transmit an account registration packet to the customer computing device 110. The account registration packet may present the customer with various interfaces (e.g., in the form of webpages) that request various forms of information from the customer (e.g., social security number, name, address, etc.) necessary to open up an account. Examples of such interfaces are discussed with respect to FIGS. 3A-3F.

At process 206, the customer is approved for the new account. In various embodiments, the account creation circuit 134 verifies the identity of the customer using information obtained from the customer via the various registration interfaces presented to the customer. For example, when the customer provides an image of a piece of identification, the account creation circuit 134 may verify the authenticity of the customer's identification by comparing the image to an identification template having various markings associated with a legitimate piece of identification. Additionally, the account creation circuit 134 may request the customer to capture an image or video of the customer's face while the customer performs a predetermined action (e.g., blinks in a predetermined pattern). The captured image of the customer's face may then be compared to a portion of the image of the customer's identification that contains the face of the customer to verify the identity of the customer.

Additionally, the account creation circuit 134 may cross-reference the customer's identity with various databases (e.g., maintained by credit bureaus) to determine the eligibility of the customer for the requested account. If the customer is eligible and the customer's identity is verified, the account creation circuit 134 generates an account for the customer in real-time at process 208. In some embodiments, the account creation circuit 134 generates an account number for the customer, and creates an entry in the accounts database 132 for the customer's new account during the account creation session established at process 304. Thus, unlike in conventional account generation processes, where the financial institution issues account numbers only periodically (e.g., twice per day), the systems and methods disclosed herein generate an account number for the customer almost immediately after the customer provides the necessary information.

At process 210, the account creation circuit 134 generates a card number for the new customer account. In some embodiments, the account creation circuit 134 generates a card number that is to be associated with the customer's new account based on a predetermined format. Additionally, the account creation circuit 134 initiates a sequence to generate a physical payment card (e.g., a magnetic strip debit card or smart card) for the customer's new account bearing the generated card number and have the card sent to the customer. For example, the account creation circuit 134 may notify appropriate financial institution personnel regarding the newly generated account number and the personnel may mail the physical payment card to the customer to a mailing address provided by the customer.

In traditional account activation sequences, the card number associated with the customer's new account is tied to the physical payment card. As such, the customer is unable to use the card to complete transactions until various other parameters (e.g., expiration date, card verification value) are established for the physical payment card. However, in accordance with the systems and methods disclosed herein, the card number generated for the customer's new account is not completely tied to the physical payment card. Rather, the account creation circuit 134 stores the card number in association with the customer's account prior to the aforementioned attributes of the physical payment card being established. Thus, the card number may have a token associated therewith and be utilized by the customer in various payment service applications prior to the issuance of the physical payment card.

At process 212, a PIN is digitally established for the new customer account. To enable the customer to utilize the new account prior to the issuance of a physical payment card, a PIN-selection interface (e.g., the interface 352 discussed with respect to FIG. 3H) is transmitted to the customer mobile device 120. The PIN-selection interface enables the customer to establish a PIN for the card number generated at process 210 for potential use in transactions. After the customer inputs a PIN into the PIN-selection interface, the customer mobile device 120 transmits the PIN to the financial institution computing system 120, which stores the customer-input PIN in association with the customer's account in the accounts database 132.

In various embodiments, processes 206-212 discussed herein must be performed within the account creation session established for the customer at process 204. In other words, if, for example, the customer cancels the account registration process or closes a web browser on the customer mobile device 120 such that the account creation session ends, the customer is unable to select a PIN for the new customer account.

At process 214, account access credentials are established for the customer. In various embodiments, the account access credentials enable the customer to access functionalities (e.g., an online banking platform, a mobile banking application) provided by the financial institution computing system 130 (e.g., via the account management circuit 136). Assuming that the customer has not previously established account access credentials at the financial institution, the account creation circuit 134 may transmit another registration interface (e.g., the interface 360 described with respect to FIG. 3I) to the customer mobile device 120 prompting the customer to establish a set of account access credentials.

At process 216, a customer input to manage the new account is received. For example, in some embodiments, upon the customer establishing the account access credentials, the customer may input the established credentials into an online banking access portal. In response, the financial institution computing system 130 (e.g., via the account management circuit 136) may authenticate the customer by comparing the customer-input credentials with the credentials established at process 214. If the customer is authenticated, the account management circuit 136 initiates account management session at 218 by retrieving information stored in association with the customer's account access credentials from the accounts database 132. At process 220, the retrieved information is used to present the customer with an account management interface. For example, the account management circuit 136 may transmit an account information packet to the customer mobile device 120 for viewing as a mobile webpage. The webpage may display various aspects of the new customer account (e.g., activation status, account number, account balance).

In some embodiments, the account activation interface presents the customer with a link to install the mobile wallet client application 124 on the customer mobile device 120. For example, the interface may provide a link to an application store enabling the customer to download the mobile wallet client application 124. At process 222, a customer preference to download the mobile wallet client application 124 is received. In some situations, the customer may provide such an input via the account management interface presented at process 220. In other embodiments, the customer may independently access an application store or a website associated with the financial institution to provide such an input. As such, in some embodiments, the customer preference to download the mobile wallet application 124 is received from the customer mobile device 120. In other embodiments, the customer preference to download the mobile wallet application 124 is received from an external computing system associated with an application provider.

At process 224, the customer mobile device 120 receives the mobile wallet client application 124. For example, the customer may download the application from a mobile application store, which may register the customer mobile device 120 (e.g., assign a unique identifier to the customer mobile device 120) and provide information (e.g., the unique identifier) to the mobile wallet circuit 144 enabling the mobile wallet circuit 144 to initiate a sequence to register the customer for a mobile wallet account.

At process 226, the customer is registered for a mobile wallet. For example, after the installation of the mobile wallet client application 124 on the customer mobile device 120, the mobile wallet client application 124 may cause the customer mobile device 120 to present the customer with a series of mobile wallet registration interfaces to receive customer identifying information (e.g., name, address) and setup customer login credentials (e.g., username, password, mobile wallet PIN). In some embodiments, the mobile wallet registration interfaces are also configured to receive information regarding payment accounts that the customer wishes to provision to the customer's mobile wallet (e.g., the customer may manually enter an account number, or capture a picture of a card). After receiving the information requested by the mobile wallet interfaces, the mobile wallet circuit 144 may generate a mobile wallet account for the customer. For example, the mobile wallet circuit 144 may generate tokens for each account identified by the customer (e.g., either internally or by communicating with an external computing system) and store the tokens in association with the customer's mobile wallet account. Additionally, such tokens may be transmitted to the customer mobile device 120 for storage therein (e.g., in a secure element) or transmitted to a host emulation service for later retrieval by the customer mobile device 120 when the customer wishes to engage in a transaction via the mobile wallet client application 124.

At process 228, the mobile wallet circuit 144 identifies available customer accounts. In embodiments where the mobile wallet circuit 144 is a part of or otherwise associated with the financial institution computing system 130, the mobile wallet circuit 144 may query the accounts database 132 for accounts of the customer using information gathered from the customer during the registration process of the mobile wallet (e.g., a customer name) to identify customer accounts having eligible payment cards associated therewith. In accordance with the systems and methods herein, the mobile wallet circuit 144 is configured to not only identify customer accounts having activated, physical payment accounts associated therewith. Rather, the mobile wallet circuit 144 is configured to also identify accounts not yet having activated physical payment cards associated therewith. For example, the mobile wallet circuit 144 may identify recently established customer account having only an un-activated payment card number associated therewith.

In embodiments where the mobile wallet computing system 140 is separate from the financial institution computing system 130, the mobile wallet circuit 144 may formulate information request via an API and transmit the information request to the financial institution computing system 130. In response, the financial institution computing system 130 (e.g., via the account management circuit 136) may query the accounts database 132 for accounts associated with the customer and provide information regarding any identified accounts to the mobile wallet computing system 140. The information regarding the customer accounts received by the mobile wallet computing system may include account identifying information (e.g., tokens, portions of account numbers) as well as a status indicator associated with an account indicating whether the account has any inactivated or activated payment card number associated therewith.

Thus, the systems and methods disclosed herein provide a convenient pathway for customers to provision and utilize recently established accounts that is a technical improvement over current systems. In current systems, a customer is only able to identify an account to be provisioned to a mobile wallet via capturing an image of an existing physical payment card. In such systems, the customer is only able to provision a card to a mobile wallet upon receipt of the physical payment card. However, by responding to API requests formulated by mobile wallet providers with information regarding recently established customer accounts, the systems and methods disclosed herein enable customers to efficiently activate accounts from a number of different channels (e.g., mobile wallets associated with different providers). Thus, the systems and methods disclosed herein provide a technical solution to the known problem of delayed access to customer accounts.

Upon receiving information regarding accounts of the customer (e.g., at the financial institution associated with the financial institution computing system 130 and other financial institutions), the mobile wallet circuit 144 may transmit the information to the customer mobile device 120, which, via the mobile wallet client application 124, presents the customer with an account selection interface via the mobile wallet client application 124. The account selection interface is configured to receive customer inputs to provision any of the identified customer accounts to the customer's mobile wallet.

At process 230 a customer input to add the new account to the customer's mobile wallet is received. In some embodiments, the account selection interface presented to the customer via the mobile wallet client application 124 includes a depiction of the new customer account opened for the customer at process 208. The customer may indicate a preference to provision the account to the customer's mobile wallet account causing a notification signal identifying the new customer account to be transmitted to the mobile wallet circuit 144.

In response, a PIN query is presented to the customer at process 232. In some embodiments, based on the notification signal received at process 230, the mobile wallet circuit 144 is configured to determine that the account that the customer is requesting to provision to the mobile wallet is an inactivated customer account (e.g., a new customer account having no activated physical payment cards associated therewith). For example, the mobile wallet circuit 144 may query the accounts database 132 to determine the current status of the customer account. Alternatively, the mobile wallet circuit 144 may transmit an account identifying signal to the financial institution computing system 130, which may provide the status of the new account to the mobile wallet computing system 140.

In response to determining that the requested account is inactivated, the mobile wallet circuit 144 may present the customer with a PIN query at process 230. The PIN query may prompt the customer to input the PIN established by the customer at process 212.

At process 234, the mobile wallet circuit 144 determines if the customer knows the established PIN. For example, the customer may input a PIN into the PIN query, and the mobile wallet circuit 144 may compare the provided PIN to the PIN established at process 212 (e.g., by communicating the provided PIN to the financial institution computing system 130, which may compare the provided PIN to a PIN stored in the accounts database 132, or by querying the accounts database 132 directly). If the provided PIN does not match the previously established PIN, the mobile wallet circuit 144 re-performs process 212 discussed above to generate a PIN for the new customer account. For example, the customer may be presented with a webpage similar to the registration interface 352 described herein. Alternatively, the interface may be presented to the customer from within the mobile wallet client application 124.

After the customer establishes a PIN for the new customer account or if the customer knows the PIN established at process 212, account opening disclosures are presented to the customer at process 238. For example, the mobile wallet circuit 144 may transmit digital versions of documentation required to be presented to the customer upon the customer activating a bank account may be transmitted to the customer mobile device 120.

At process 240, the new customer account is provisioned to the customer's mobile wallet. For example, the mobile wallet circuit 144 may generate a token for the customer account by communicating with an external computing system (e.g., a card network computing system). After generating the token, the mobile wallet circuit 144 may transmit the token to the customer mobile device 120 (e.g., for storage in a secure element thereof) and/or store the token in the mobile wallet database 146 in association with the customer's mobile wallet account, thereby enabling the customer to engage in transactions using the tokenized account prior to the activation of any physical payment cards associated with the account.

Additionally, upon provisioning the customer account to the customer's mobile wallet, the mobile wallet circuit 144 may update the status of the customer's new account. In embodiments where the mobile wallet circuit 144 is associated with the financial institution computing system 130, for example, the mobile wallet circuit 144 may update the accounts database 132 such that the new customer account opened at process 210 no longer has an inactive status indicator associated therewith. In an example, the accounts database 132 is updated such that the new customer account has an intermediate status associated therewith. In various embodiments, when accounts have an intermediate status, such accounts are only available for use in certain forms of transactions (e.g., tokenized transactions via payment service applications such as the mobile wallet client application 124). To render the new account fully active, the customer may be required to activate the physical payment card once it is received.

In embodiments where the mobile wallet circuit 144 is not associated with the financial institution computing system 130, the mobile wallet circuit 144 may transmit a provisioning notification signal to the financial institution computing system 130 over the network, which may cause the financial institution computing system 130 (e.g., via the account management circuit 136) to update the accounts database 132 to reflect the updated status (e.g., an intermediate status) of the customer's account.

It should be noted that alternative process flows are envisioned than those described in the figures. As shown in FIG. 2A, for example, the customer utilizes three separate platforms (e.g., the account creation circuit 134, the account management circuit 136, and the mobile wallet circuit 144) to register for and activate a new account. In some embodiments, the customer utilizes a different set of platforms. For example, in some embodiments, the customer does not manage the new account prior to the new account's activation. In such a case, processes 218-222 are omitted from the method 200. Alternatively, the customer may perform a process similar to the method 200 entirely within a native application on the customer mobile device 120. In such a process, the native application may include an account creation widget configured to gather the information from the customer in processes 202-216 discussed above. For example, the native application may present the customer with registration graphical user interfaces similar to those discussed below with respect to FIGS. 3B-3F. Upon gathering the information, the native application may cause the customer mobile device 120 to transmit a customer information packet to the financial institution computing system 130, which may perform processes 206-210 to establish the customer's new account. Additionally, the native application may also include a digital wallet widget similar to the mobile wallet client application 124 discussed above enabling processes 226-240 to also be performed within the native application.

Figure 2B:
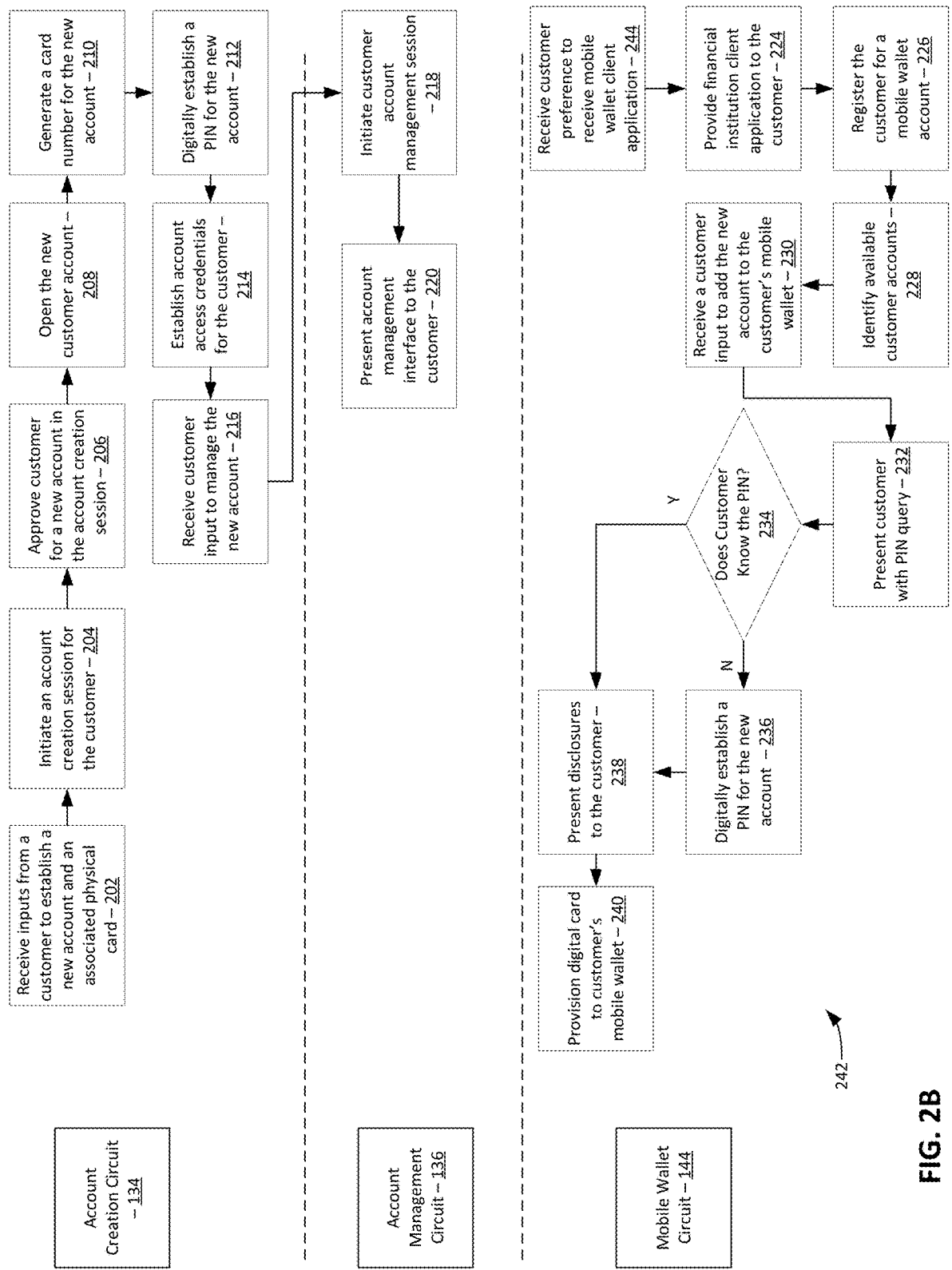

Referring now to FIG. 2B, a flow diagram of a method 242 of activating a customer account is shown, according to an example embodiment. The method 242 has steps that are similar to the steps of the method 200 discussed above with respect to FIG. 2A. The method 242 differs from the method 200 in that the customer does not utilize the customer mobile device 120 to initially register for a new account, but the customer computing device 110. As such, the processes 202-220 are substantially similar for both the methods 200 and 242, but are optimized for a personal computer rather than a mobile device in the method 242.

An additional difference between the methods 200 and 242 is that, because the customer performs processes 202-220 on the customer computing device 110 rather than the customer mobile device 120, the customer switches from the customer computing device 110 to the customer mobile device 120 to request that the mobile wallet client application 124 be installed on the customer mobile device 120. As such, an initial customer request is received via the mobile wallet circuit 144 rather than the account management circuit 136 at process 244. After this, the method 242 includes processes 224-240 that are substantially similar to those discussed with respect to FIG. 2A.

Figure 2C:
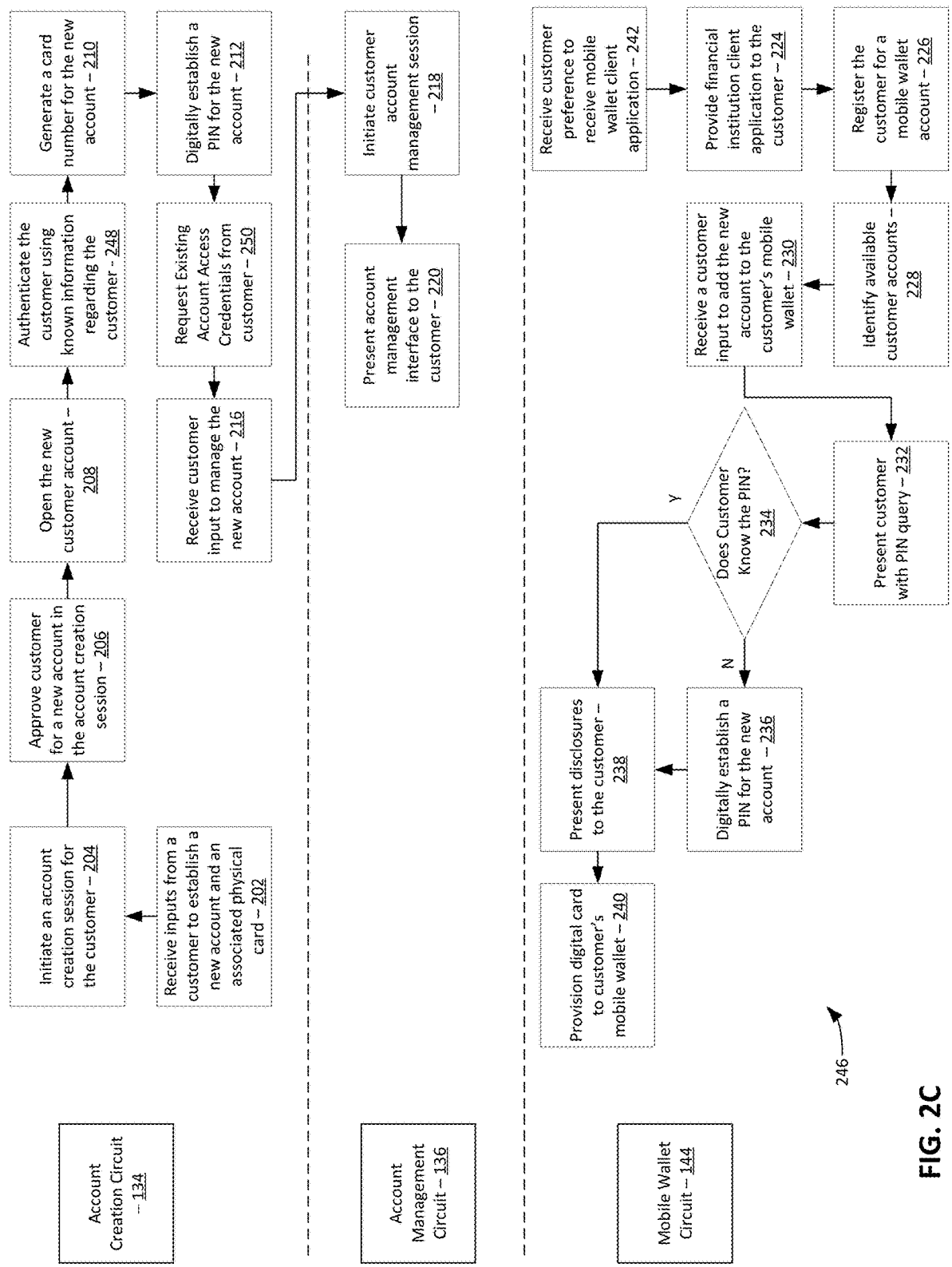

Referring now to FIG. 2C, a flow diagram of a method 246 for activating a customer account is shown, according to an example embodiment. The method 246 is a modified version of the method 242 discussed with respect to FIG. 2B. Specifically, the method 246 is modified for existing customers already having a relationship (e.g., an account) at the financial institution associated with the financial institution computing system 130 and having existing account management credentials associated therewith. For example, the method 246 may be executed to enable existing customers of the financial institution to establish additional accounts at the financial institution.

As such, processes 202, 204, and 206 of the method 246 are substantially similar as discussed above with respect to FIG. 2A. In the method 246, however, the customer may have an existing relationship with the financial institution during the registration process for the new account (e.g., an account registration interface such as the interface 310 discussed with respect to FIG. 3B may be presented to the customer). In response to the customer providing such an indication, the account creation circuit 134 may modify the execution of the method 242 discussed with respect to FIG. 2B to incorporate process 248 and replace process 214 discussed above with process 250.

At process 248, the customer is authenticated using known information regarding the customer. For example, since the customer has an existing relationship with the financial institution, information regarding the customer may be stored in the accounts database 132. The account creation circuit 134 may utilize such information to formulate a verification prompt. In some embodiments, the verification prompt includes a security question transmitted to the customer computing device 110 (e.g., as webpage) requesting the customer to input requested information. In some embodiments, the requested information is a one-time passcode transmitted to the customer mobile device 120 (e.g., via a SMS message). In some embodiments, the verification prompt queries the customer regarding information stored in the accounts database 132 (e.g., an account balance, a past transaction of the customer).

After the customer responds to the verification prompt, the account creation circuit 134 authenticates the customer by comparing the customer-input information to the requested information (e.g., the one-time passcode, information regarding the customer stored at the accounts database 132). In some embodiments, if the customer-input information does not match the requested information, the method 246 ends and the customer's new account is activated via conventional methods (e.g., the account is inactive until the customer activates a physical payment card mailed to the customer). If the customer is verified, however, the method 246 advances to perform processes 210 and 212 discussed above. At process 250, the customer is requested to input existing account access credentials instead of establishing a new set of account access credentials. After the existing account access credentials are entered by the customer, the method 246 proceeds with process 218-240 that are substantially the same as discussed with respect to FIGS. 2A-2B.

Figure 2D:
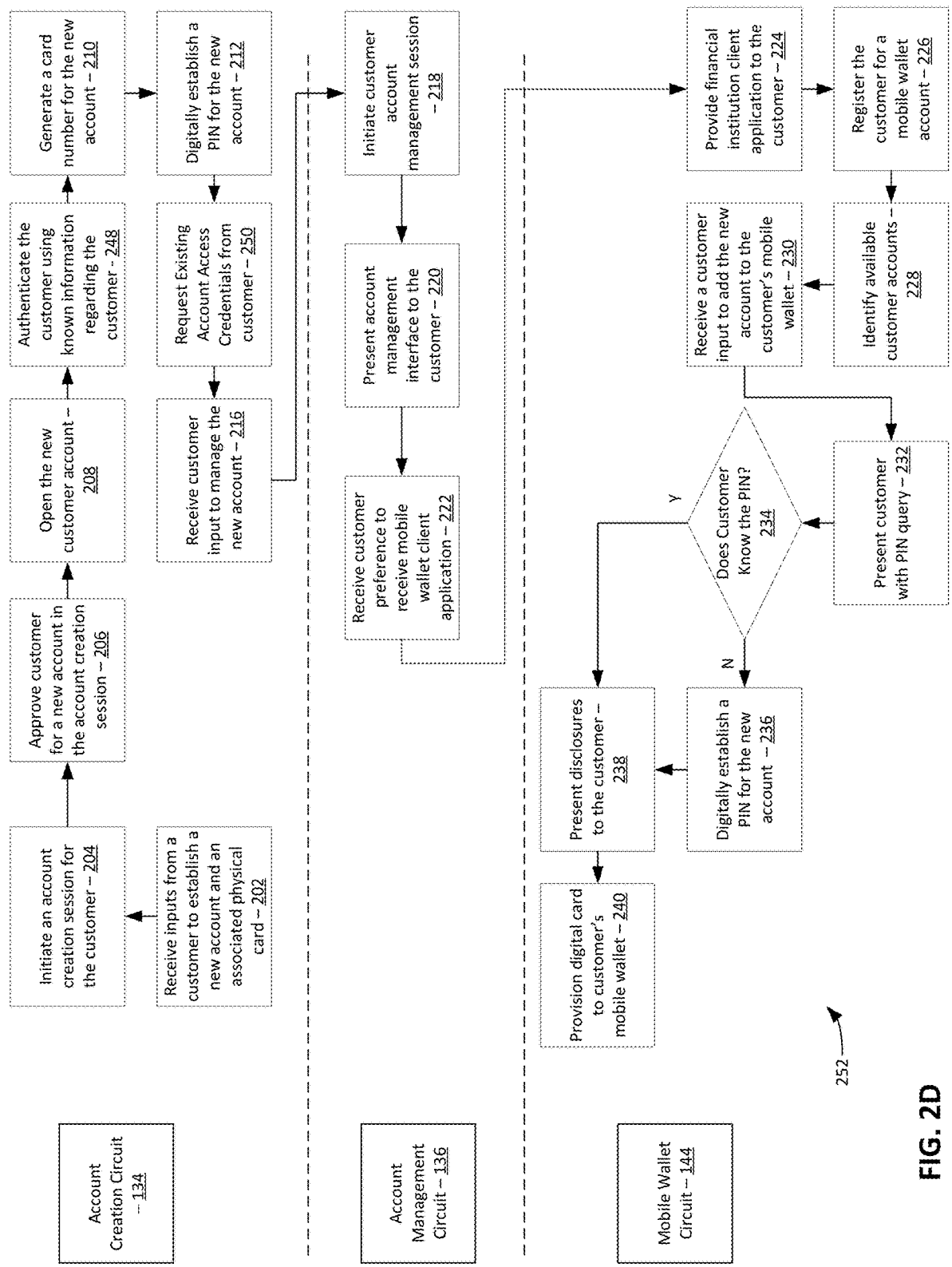

Referring now to FIG. 2D, a flow diagram of a method 252 for activating a customer account is shown, according to an example embodiment. The method 252 is substantially similar to the method 246 discussed with respect to FIG. 2C, except that the customer performs processes 202-220 on the customer mobile device 120 as opposed to the customer computing device 110. As such, the processes 202-220 are optimized for a mobile computing environment rather than a personal computing environment. Additionally, the initial customer request to download the mobile wallet client application 124 may be received from within an account activation session established by the account management circuit 136. As such, the method 252 includes process 222 discussed with respect to FIG. 2A.

Figure 2E:
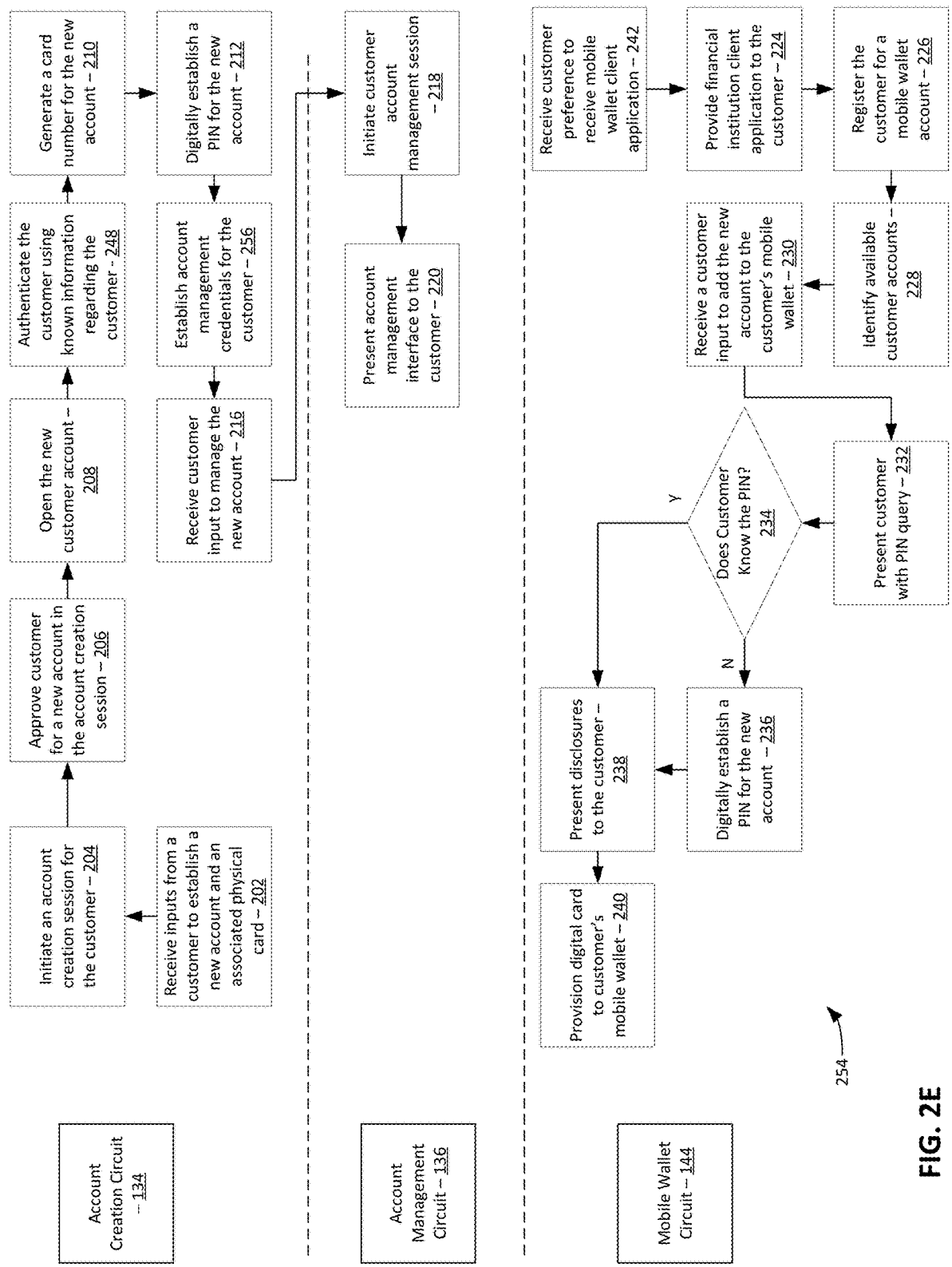
Figure 2F:
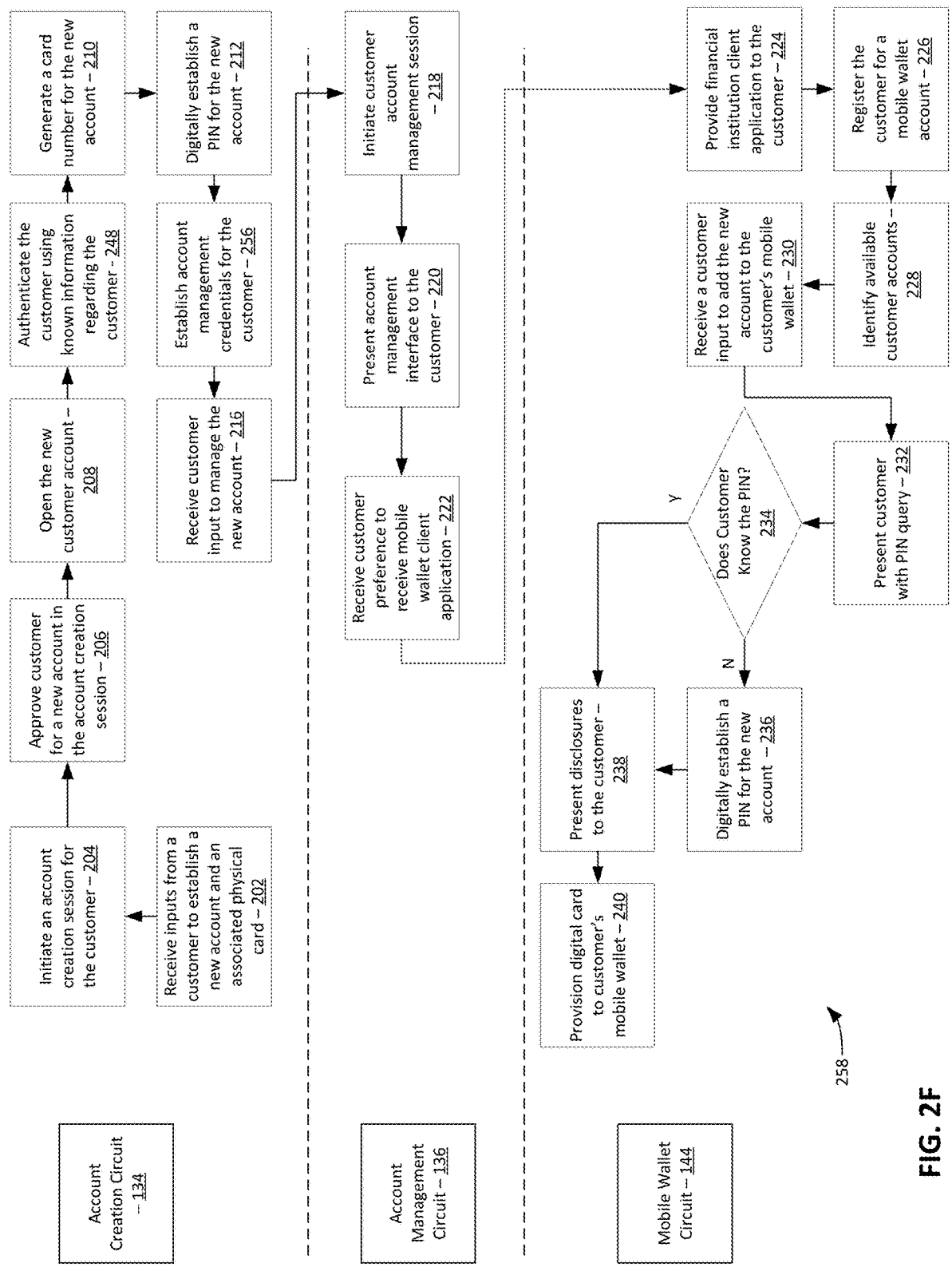

Referring now to FIG. 2E, a flow diagram of a method 254 for activating a customer account is shown, according to an example embodiment. The method 254 is a version of the method 246 discussed with respect to FIG. 2C that is modified for existing customers of the financial institution associated with the financial institution computing system 130 that have not yet established account access credentials. For example, the account creation circuit 134 may determine that the customer has an account at the financial institution based on information provided by the customer via the registration process described herein (e.g., by querying the accounts database 132 using a customer name, social security number, and/or address). Accordingly, rather than requesting existing account management credentials from the customer, the account creation circuit 134 requests the existing customer to establish a set of account management credentials (e.g., via transmittal of an interface similar to the registration interface 360 discussed with respect to FIG. 3I) at process 256. FIG. 2F is a similar modification of the method 252 discussed with respect to FIG. 2D.

Figures 3A, 3B:
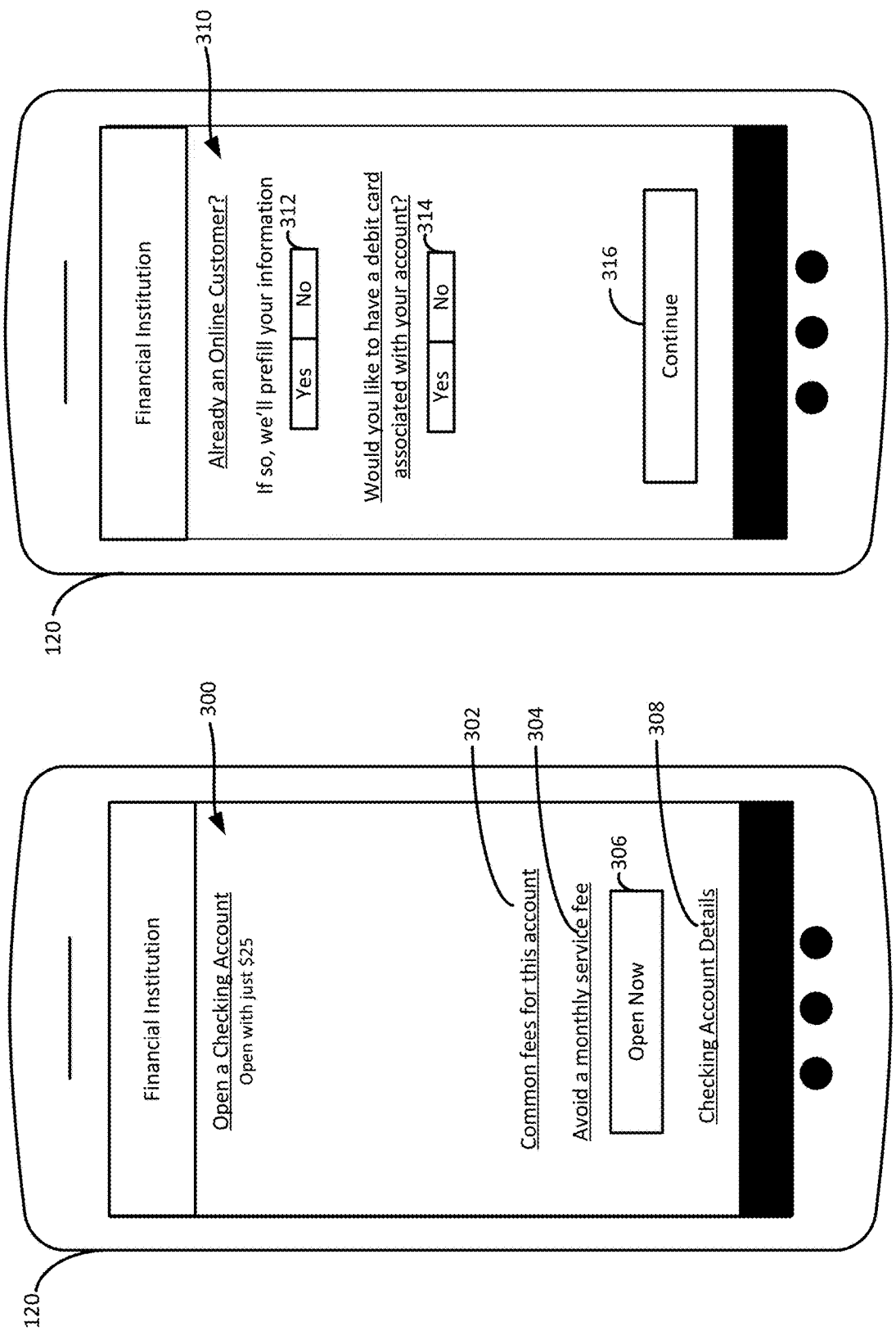

Turning now to FIG. 3A, an account opening graphical user interface 300 is shown, according to an example embodiment. In various embodiments, the account opening graphical user interface 300 may be presented to the customer when the customer navigates through the communication channel (e.g., a web browser or separate application such as the mobile banking client application 124) established with the financial institution computing system 130 to view an option to establish a checking account at the financial institution. In the example shown, the account opening graphical user interface 300 includes a fees hyperlink 302, a fee avoidance hyperlink 304, an account opening button 306, and an account details hyperlink 308. The fees hyperlink 302 may cause another graphical user interface to be displayed providing details of the common fees (e.g., overdrawing fees, service fees, etc.) associated with the selected account type. The other graphical user interface may take the form of a digitized document rather than a webpage. The fee avoidance hyperlink 304 may be configured to receive a customer input to view information regarding how to avoid the fees detailed in the documentation presented in response to customer selection of the fees hyperlink. For example, the financial institution may establish a policy where customers pay no fees if certain rules are followed (e.g., keeping an account balance above a threshold). The account opening button 306 is configured to receive the customer input to open up the selected account type. The checking account details hyperlink 308 may cause another graphical user interface to be displayed providing various details as to checking accounts at the financial institution. For example, in response to selecting the account details hyperlink 308, a display screen is provided that includes an graphical user interface detailing various services provided by the financial institution to account holders (e.g., fraud detection, alerts, budgeting tools, banking applications, etc.). In some embodiments, in response to a customer selection of the account opening button 306, a notification signal is transmitted to the financial institution computing system 130 (e.g., initiating the method 200 discussed above).

Turning now to FIGS. 3B-3F, account registration interfaces are shown, according to various example embodiments. FIG. 3B shows a registration graphical user interface 310 that may be displayed in response to the customer providing the account-creation input (e.g., at process 202 of the method 200 or any of the other methods disclosed herein). In the example shown, the graphical user interface 310 includes a status indicator button 312, a card preference button 314, and a continue button 316. The status indicator button 512 is configured to receive a customer indication as to whether the customer is already an online customer of the financial institution. If so, the accounts database 132 may include information regarding the customer that may be used to establish the customer's new account. Accordingly, if the customer provides an indication that the customer is already an online customer, the account creation circuit 134 may query the accounts database 132 for information regarding the customer, and additional information gathering steps may be avoided in the process for registering the customer for an account.

The card preference button 314 is configured to receive a customer input to have a physical payment card (e.g., a debit card) associated with the new account. In response to the customer providing such an input, the account creation circuit 134 performs an eligibility check to determine if the particular account for which the customer is registering is compatible with a physical payment card based on a set of eligibility rules pre-established by the financial institution. If the card is eligible for a card, the method 200 continues. In some embodiments, if the type of account being opened by the customer is not eligible for a card, the method 200 ends. The continue button 516 is configured to receive a customer input to continue the account creation process.

FIG. 3C shows an additional registration graphical user interface 318 configured to receive information from the customer to establish a new account. In the example shown, the graphical user interface 318 includes a photo capture button 320 and a cancel button 322. The photo capture button 320 is configured to receive a customer input to capture a photo of a piece of customer identification such as a driver's license or passport. In response to the customer providing such an input (e.g., by pressing the photo capture button 520), program logic (e.g., received from the financial institution computing system 130) being executed by the processor of the customer mobile device 120 causes the processor to activate a camera on the customer mobile device 120. Additionally, the customer is presented with an graphical user interface that shows the view of the camera and includes additional instructions for capturing the image (e.g., the graphical user interface may include an outline shape of a piece of identification and prompt the customer to line the piece of identification up within the outline prior to capturing an image). When the customer lines the piece of identification up within the viewing angle of the camera, the camera automatically captures an image of the customer identification. The customer mobile device 120 then transmits the captured image over the network 150 to the financial institution computing system 130.

FIG. 3D shows an additional registration graphical user interface 324 configured to receive additional customer information necessary to create a customer account. In the example shown, the graphical user interface 324 includes an information requesting window 326 and a cancel button 328. The information gathering window 326 includes various fields requesting various forms of information from the customer. For example, the information gathering window may request a customer e-mail (e.g., for the purposes of alerting the customer to account activity), a customer phone number, a customer phone type (e.g., via a dropdown menu enabling the customer to select from a number of different phone types such as mobile, home, or office), social security number, and occupation (e.g., for the purpose of verifying the customer's identity). The cancellation button 328 enables the customer to provide an input to end the account registration sequence FIG. 3E shows an additional registration graphical user interface 330 configured to receive information regarding a funding source for customer's new account. Graphical user interface 330 includes a first funding source option 332, a second funding source option 334, a third funding source option 336, and a cancel button 338. Funding source options 332-334 are configured to receive a customer input to provide an initial deposit to fund the new account with a specific type of payment vehicle. Upon selection of any of the options 332-344, an additional graphical user interface is displayed enabling the customer to input information regarding the selected vehicle (e.g., an account number, expiration data, other authentication information such as a CVV number). The information regarding the payment vehicle may be input manually by the customer or the customer may take an image of the payment vehicle (e.g., a check, a credit card, or a debit card) via methods similar to those discussed herein in relation to the image of the customer's identification. The cancel button 338 enables the customer to cancel the account registration process. In some embodiments, the financial institution computing system 130 erases all information obtained from the customer in response to the customer selecting the cancel button 338 (or any of the other cancel buttons described herein).

Upon receipt of the customer funding information, the financial institution computing system 130 formulates a transaction request and initiate communications over the network 150 with another financial institution computing system associated with the payment vehicle identified by the customer to approve a transfer into the customer's new account. For example, if the customer input checking account information into the funding source graphical user interface 330, the financial institution computing system 130 may formulate a transaction request and transmit the transaction request to another financial institution associated with the checking account. The other financial institution may approve the request, and transfer funds from the checking account to the financial institution associated with the financial institution computing system 130 to fund the new account.

FIG. 3F shows another registration graphical user interface 340 configured to receive a customer input verifying information gathered during the account registration sequence. In the example shown, the graphical user interface 340 includes a customer information window 342 and an amendment button 344. The customer information window 342 contains various fields for various items of information gathered from the customer. In the example shown, the information includes only information extracted from the captured image of the customer's identification such as a customer name, a type of customer identification, an issuing entity of the identification, an expiration, a date of birth, and a customer address. In some embodiments, the information window 342 also includes additional information gathered directly from the customer. The amendment button 544 enables the customer to amend the information to be used to create the new account. For example, a customer's preferred address may vary from the address extracted from the captured image of the customer's identification, and the customer may amend the address to a more preferred address.

Referring to FIG. 3G, an account creation graphical user interface 346 is shown, according to an example embodiment. In some embodiments, the account creation graphical user interface 346 is presented to the customer after the financial institution computing system 130 approves the customer for the new account. In the example shown, the account creation graphical user interface 346 includes an account information window 348 and PIN establishment button 550. The account information window 348 provides information to the customer regarding the newly created checking account. In the example shown, the account information window 348 only includes the account number. In some embodiments, the account information 348 includes additional information. For example, the account information window 348 may inform the customer regarding services provided by the financial institution relating to the account (e.g., fraud monitoring, alerts, budgeting tools). Additionally, the account information window 348 may inform the customer regarding a mobile banking application provided by the financial institution that enables the customer to manage the newly created account. The PIN establishment button 550 is configured to receive a customer input to establish a PIN for the new customer account.

FIG. 3H shows a PIN selection graphical user interface 352, according to an example embodiment. In the example shown, the PIN selection graphical user interface 352 includes PIN entry fields 354 configured to receive a customer-input sequence of symbols (e.g., a sequence of at least four numbers) to be established as the PIN for the customer's new account, a PIN creation button 356, and an online banking enrollment button 358. The PIN creation button 356 is configured to receive a customer input to establish the customer-input symbol sequence into the PIN entry fields 354 as the PIN associated with the customer's new account. In various embodiments, in response to the customer selecting the PIN creation button 356, the customer-input symbol sequence is stored in association with the customer's account in the accounts database 132 and used to authenticate the customer prior to providing access to the new account. The online banking enrollment button 358 is configured to receive a customer preference to enroll in an online banking service provided by the financial institution.

Figure 3I:
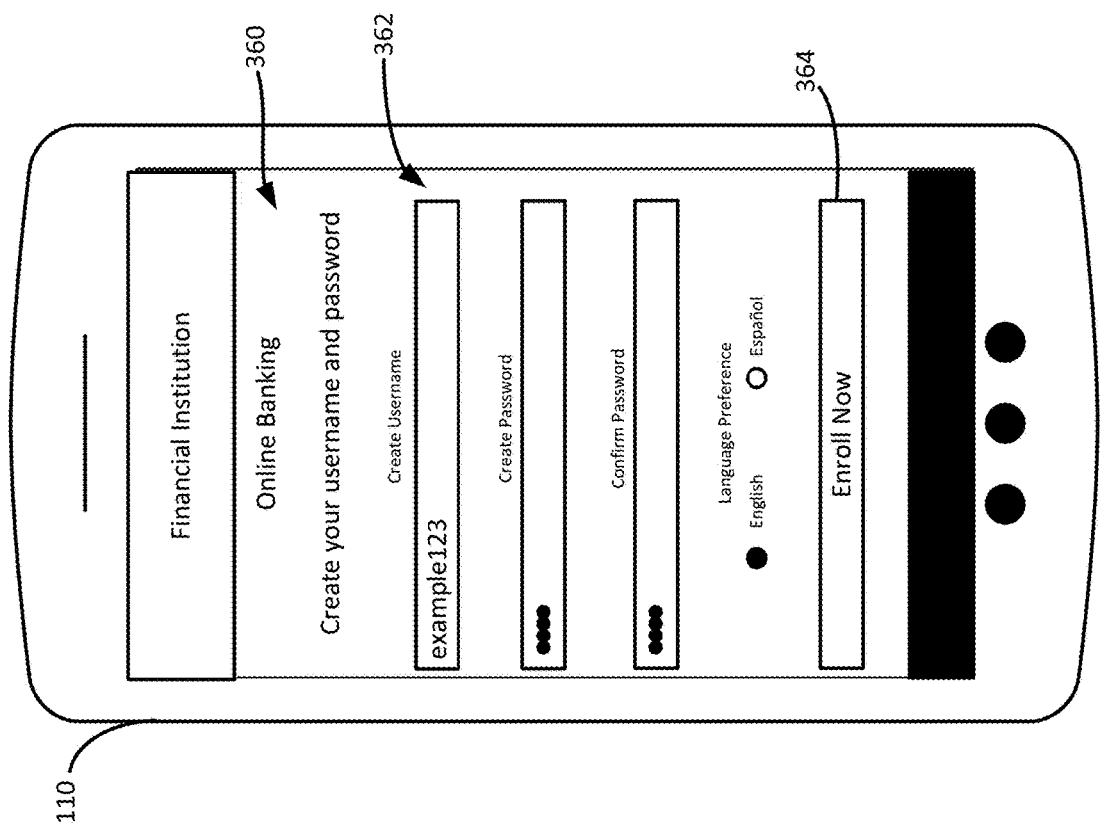

FIG. 3I shows an access credential graphical user interface 360, according to an example embodiment. In the example shown, the access credential graphical user interface 360 includes a credential window 362 and an enrollment button 364. The credential window 362 includes various fields enabling the customer to establish login credentials to access the new account. For example, the credential window 554 enables the customer to establish a username, a password, and a language preference with respect to an online banking account generated basically at the same time as the customer's new checking account. In some embodiments, the credential window 362 enables the customer to establish additional credentials to access online banking. For example, the credential window may enable the customer to establish biometric credentials (e.g., fingerprint recognition, facial recognition, or voice recognition). Additionally, the credential window 362 may enable the customer to answer a security question that must be answered for the online banking account to be accessed. The enrollment button 364 enables the customer-input credentials to be transmitted to the financial institution computing system 130 over the network 150 and stored in the accounts database 132 in association with the newly-created customer account.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function. Input devices may include, for example, a mechanical keyboard, a touchscreen, a microphone, a camera, a fingerprint scanner, any customer input device engageable to the customer computing device 110 via a USB, serial cable, Ethernet cable, and so on. Output devices may include, for example, a digital display, a speaker, illuminating icons, LEDs, and so on.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
    transmitting, by a user device to a financial computing system, a first input from a user regarding opening an account at a financial institution associated with the financial computing system;
    establishing, by the user device, a communication session based on exchanging encryption keys between the user device and the financial computing system;
    in response to establishing the communication session, automatically installing, by the user device, a mobile wallet client application;
    displaying, via the mobile wallet client application on the user device, a graphical user interface (GUI) comprising a request for a user verification;
    transmitting, by the user device via the communication session, a received user verification to the financial computing system;
    updating, by the user device, the GUI to display a request to establish a personal identification number (PIN) for a physical payment card associated with the account;
    receiving, by the user device via the GUI, the PIN from the user;
    transmitting, by the user device via the communication session, a second input comprising the PIN and a request to provision the account to the user device;
    receiving, by the user device via the communication session, a payment token associated with the account before the physical payment card associated with the account of the financial computing system is received by the user; and
    storing, by the user device, the payment token for transactions via the user device; and
    wherein the mobile wallet client application is sandboxed such that a unique customer ID (UID) is assigned to the mobile wallet client application, and wherein other applications installed on the user device that include the UID are configured to share the payment token.

2. The method of claim 1, further comprising:
    receiving, by the user device, a login credential for accessing the account; and
    transmitting, by the user device via the communication session, the login credential inputted by the user to the financial computing system for storage.

3. The method of claim 2, wherein the login credential comprises a biometric credential including at least one of a fingerprint biometric, a facial biometric, or a voice biometric.

4. The method of claim 1, further comprising:
    in response to establishing the communication session, receiving, by the user device, an account registration packet configured to display the GUI comprising the request for the user verification.

5. The method of claim 1, further comprising:
    before activating the physical payment card, transmitting, by the user device to a merchant point-of-sale (POS) system, a transaction request comprising the payment token and a cryptogram for a transaction.

6. The method of claim 1, further comprising
    updating, by the user device, the GUI to display a request to select a payment vehicle, wherein the request comprises a plurality of payment vehicles;
    receiving, by the user device via the GUI, a selection of one of the plurality of payment vehicles; and
    in response to receiving the selection of one of the plurality of payment vehicles, transmitting, by the user device to a merchant point-of-sale (POS) system, a transaction request comprising the payment vehicle.

7. A user device associated with a user, comprising:
    a processing circuit comprising at least one processor coupled to a memory storing instructions that, when executed by the at least one processor, cause the processing circuit to:
        transmit, to a financial computing system, a first input from the user regarding opening an account at a financial institution associated with the financial computing system;
        establish a communication session based on exchanging encryption keys between the user device and the financial computing system;
        in response to establishing the communication session, automatically install a mobile wallet client application;
        display a graphical user interface (GUI) comprising a request for a user verification via the mobile wallet client application;
        transmit, via the communication session, a received user verification to the financial computing system;
        update the GUI to display a request to establish a personal identification number (PIN) for a physical payment card associated with the account;
        receive, via the GUI, the PIN from the user;
        transmit, via the communication session, a second input comprising the PIN and a request to provision the account to the user device;
        receive, via the communication session, a payment token associated with the account before the physical payment card associated with the account of the financial computing system is received by the user; and
        store the payment token for transactions via the user device;
        wherein the mobile wallet client application is sandboxed such that a unique customer ID (UID) is assigned to the mobile wallet client application, and wherein other applications installed on the user device that include the UID are configured to share the payment token.

8. The user device of claim 7, wherein the instructions further cause the processing circuit to:
    establish a login credential for accessing the account; and
    transmit, via the communication session, the login credential to the financial computing system for storage.

9. The user device of claim 8, wherein the login credential comprises a biometric credential including at least one of a fingerprint biometric, a facial biometric, or a voice biometric.

10. The user device of claim 7, wherein the instructions further cause the processing circuit to:
    in response to establishing the communication session, receive an account registration packet configured to display the GUI comprising the request for the user verification.

11. The user device of claim 7, wherein the instructions further cause the processing circuit to:
    before activating the physical payment card, transmit, to a merchant point-of-sale (POS) system, a transaction request comprising the payment token and a cryptogram for the transaction.

12. The user device of claim 7, wherein the instructions further cause the processing circuit to:

update the GUI to display a request to select a payment vehicle, wherein the request comprises a plurality of payment vehicles;

receive, via the GUI, a selection of one of the plurality of payment vehicles; and in response to receiving the selection of one of the plurality of payment vehicles, transmit, to a merchant point-of-sale (POS) system, a transaction request comprising the payment vehicle.

13. A non-transitory computer-readable storage media having instructions stored thereon that, when executed by at least one processing circuit, cause the at least one processing circuit to:

transmit, to a financial computing system, a first input from a user regarding opening an account at a financial institution associated with the financial computing system;

establish a communication session based on exchanging encryption keys between the at least one processing circuit and the financial computing system;

in response to establishing the communication session, automatically install a mobile wallet client application on a user device;

provide a graphical user interface (GUI) comprising a request for a user verification via the mobile wallet client application;

transmit, via the communication session, a received user verification to the financial computing system;

update the GUI to display a request to establish a personal identification number (PIN) for a physical payment card associated with the account;

receive, via the GUI, the PIN from the user;

transmit, via the communication session, a second input comprising the PIN and a request to provision the account to the user device having the at least one processing circuit;

receive, via the communication session, a payment token associated with the account before the physical payment card associated with the account of the financial computing system is received by the user; and store the payment token for transactions via the user device.

14. The non-transitory computer-readable storage media of claim 13, wherein the instructions, when executed by the at least one processing circuit, further cause the at least one processing circuit to:

establish a login credential for accessing the account, wherein the login credential comprises a biometric credential including at least one of a fingerprint biometric, a facial biometric, or a voice biometric; and transmit, via the communication session, the login credential to the financial computing system for storage.

15. The non-transitory computer-readable storage media of claim 13, wherein the instructions, when executed by the at least one processing circuit, further cause the at least one processing circuit to:

in response to establishing the communication session, receive an account registration packet configured to display the GUI comprising the request for the user verification; and before activating the physical payment card, transmit, to a merchant point-of-sale (POS) system, a transaction request comprising the payment token and a cryptogram for the transaction.

* * * * *